(12) United States Patent
Brandt et al.

(10) Patent No.: US 10,091,208 B2
(45) Date of Patent: *Oct. 2, 2018

(54) FIREWALL METHOD AND APPARATUS FOR INDUSTRIAL SYSTEMS

(71) Applicant: ROCKWELL AUTOMATION TECHNOLOGIES, INC., Mayfield Heights, OH (US)

(72) Inventors: David D Brandt, New Berlin, WI (US); Brian A Batke, Novelty, OH (US); Bryan L Singer, Alabaster, AL (US); Craig D Anderson, River Falls, WI (US); Glenn B Schulz, Lannon, WI (US); Michael A Bush, Hudson, OH (US); John C Wilkinson, Jr., Hudson, OH (US); Ramdas M Pai, Racine, WI (US); Steven J Scott, Brookfield, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/167,289

(22) Filed: May 27, 2016

(65) Prior Publication Data

US 2016/0277416 A1 Sep. 22, 2016

Related U.S. Application Data

(63) Continuation of application No. 14/278,225, filed on May 15, 2014, now Pat. No. 9,369,436, which is a
(Continued)

(51) Int. Cl.
*H04L 29/06* (2006.01)

(52) U.S. Cl.
CPC ............ *H04L 63/102* (2013.01); *H04L 63/02* (2013.01); *H04L 63/0245* (2013.01);
(Continued)

(58) Field of Classification Search
CPC ............... H04L 63/102; H04L 63/0428; H04L 63/0245
See application file for complete search history.

(56) References Cited

U.S. PATENT DOCUMENTS

| 5,446,868 A | 8/1995 | Gardea et al. |
| 6,219,706 B1 | 4/2001 | Fan et al. |

(Continued)

FOREIGN PATENT DOCUMENTS

| WO | 03067847 A2 | 8/2003 |
| WO | 03079605 A1 | 9/2003 |

OTHER PUBLICATIONS

U.S. Appl. No. 90/012,312. Decision Denying Ex Parte Reexamination, dated Aug. 21, 2012. pp. 1-19.
(Continued)

*Primary Examiner* — Edan Orgad
*Assistant Examiner* — Nourali Mansoury
(74) *Attorney, Agent, or Firm* — Quarles & Bradly LLP

(57) ABSTRACT

Selectively enabling communication of dual protocol packets from a source device directed to a service of an object class at target devices is provided. Steps can include providing an access control database including an entry correlating a source device, an object class and a service of the object class; from a source device, receiving a dual protocol packet including a frame and a field according to a first network communication protocol and an encapsulated packet of a second network communication protocol; obtaining from the frame, an identification of the source device; obtaining from the encapsulated packet, an identification and a service of an object class to which the encapsulated (Continued)

packet is directed; comparing the identification of the source device, the identification and service of the object class, and the entry of the access control database; and selectively transmitting the dual protocol packet as a function of the comparison.

20 Claims, 22 Drawing Sheets

Related U.S. Application Data continuation of application No. 13/182,808, filed on Jul. 14, 2011, now Pat. No. 8,774,186, which is a continuation of application No. 11/326,742, filed on Jan. 6, 2006, now Pat. No. 7,990,967.

(60) Provisional application No. 60/641,839, filed on Jan. 6, 2005, provisional application No. 60/700,380, filed on Jul. 19, 2005.

(52) U.S. Cl.
CPC ...... *H04L 63/0263* (2013.01); *H04L 63/0428* (2013.01); *H04L 63/10* (2013.01); *H04L 69/16* (2013.01); *H04L 69/163* (2013.01); *H04L 69/166* (2013.01)

(56) References Cited

U.S. PATENT DOCUMENTS

| 6,826,694 | B1 | 11/2004 | Dutta et al. |
| 7,359,368 | B1 | 4/2008 | Pearce |
| 2002/0071436 | A1 | 6/2002 | Border et al. |
| 2003/0115328 | A1 | 6/2003 | Salminen et al. |
| 2003/0131263 | A1 | 7/2003 | Keane et al. |
| 2003/0172264 | A1 | 9/2003 | Dillon |
| 2004/0101138 | A1 | 5/2004 | Revital et al. |
| 2004/0228358 | A1 | 11/2004 | Beshai et al. |
| 2005/0129034 | A1 | 6/2005 | Takeyoshi et al. |
| 2005/0141565 | A1 | 6/2005 | Forest et al. |
| 2006/0010318 | A1 | 1/2006 | Coley et al. |
| 2006/0041328 | A1 | 2/2006 | McCormick |

OTHER PUBLICATIONS

J. Border et al. Performance Enhancing Proxies Intended to Mitigate Link-Related Degradations. The Internet Society (2001), Jun. 2001, pp. 1-48.

Examiner Mansoury, U.S. Appl. No. 11/326,142 Office Action dated Oct. 16, 2008, pp. 1-42.

Examiner Mansoury, U.S. Appl. No. 11/326,742 Office Action dated May 28, 2009, pp. 1-13.

Examiner Mansoury, U.S. Appl. No. 11/326,742 Office Action dated Dec. 11, 2009, pp. 1-20.

Exminer Mansoulry, U.S. Appl. No. 11/326,742 Office Action dated Jun. 1, 2010, pp. 1-15.

Examiner Mansoulryf, U.S. Appl. No. 11/326,742 Office Action dated Oct. 28, 2010, pp. 1-16.

Examiner Mansoury, U.S. Appl. No. 11/326,742 Notice of Allowance and Fees Due dated Mar. 22, 2011, pp. 1-2.

U.S. Appl. No. 90/012,312. Request for Ex Parte Reexamination of U.S. Pat. No. 7,990,967, dated May 30, 2012. pp. 1-53.

Ching Yun Chan. Transparent Modbus/TCP Filtering with Linux. 2005. 6 pages.

| Access Control (AC) DB | | | | | |
|---|---|---|---|---|---|
| User | Device Acc. | Time | Location | Priority | Apps. |
| U1 | D1 | 9AM-4PM | All | P3 | A1, A3, A4 |
|  | D2 | 10AM-11AM | All | P3 | A3, A8, A22... |
|  | D5, D6 | 9AM-4PM | Zone 7 | P1 | A0 . . . |
|  | D7 | All | All | P4 |  |
| . . . | | | | | |
| U2 | D1, D2 | 9AM-4PM | Zone 1 | P2 | A3, A12 |
|  | D8 | All | All | P3 | A10, A19 . . . |
| . . . | | | | | |

Fig. 10

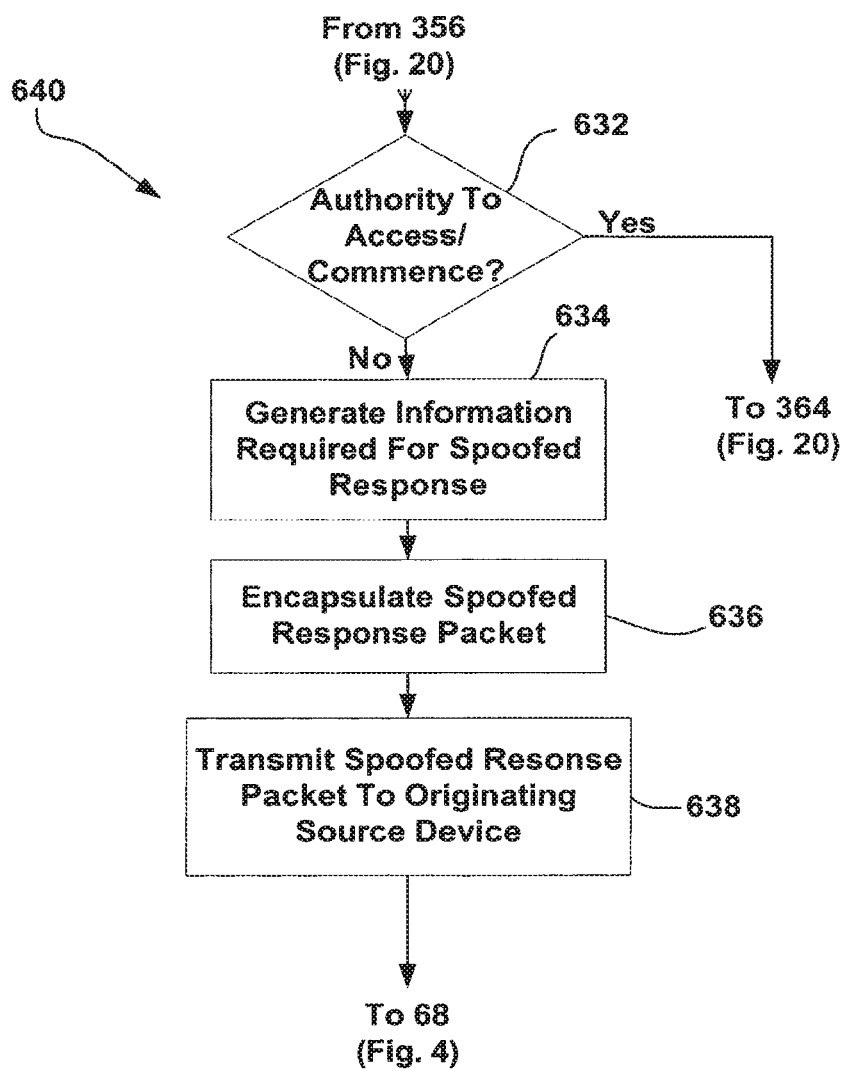

FIREWALL METHOD AND APPARATUS FOR INDUSTRIAL SYSTEMS

CROSS-REFERENCE TO RELATED APPLICATIONS

This application is a continuation of pending U.S. patent application Ser. No. 14/278,225, which was filed on May 15, 2014 and entitled "FIREWALL METHOD AND APPARATUS FOR INDUSTRIAL SYSTEMS," which is a continuation of U.S. Pat. No. 8,774,186, which was issued on Jul. 8, 2014 and entitled "FIREWALL METHOD AND APPARATUS FOR INDUSTRIAL SYSTEMS," which is a continuation of U.S. Pat. No. 7,990,967, which was issued on Aug. 2, 2011 and entitled "FIREWALL METHOD AND APPARATUS FOR INDUSTRIAL SYSTEMS," which claims priority to U.S. Provisional Patent Application No. 60/641,839, which was filed on Jan. 6, 2005 and entitled "FIREWALL METHOD AND APPARATUS FOR INDUSTRIAL SYSTEMS," and U.S. Pat. No. 7,990,967 also claims priority to U.S. Provisional Patent Application No. 60/700,380, which was filed on Jul. 19, 2005 and also entitled "FIREWALL METHOD AND APPARATUS FOR INDUSTRIAL SYSTEMS," all of which are incorporated herein by reference.

STATEMENT REGARDING FEDERALLY SPONSORED RESEARCH OR DEVELOPMENT

Not applicable.

BACKGROUND OF THE INVENTION

The present invention generally relates to industrial control systems, and more particularly to systems and methods that provide secure and firewall restricted Web-based access to control devices and components residing on a non-IP network within an industrial environment.

A typical computer network comprises a plurality of interconnected microprocessor-based devices with specialized (e.g., network) software and/or hardware that facilitates interaction between at least two devices on the network. Such interaction can provide for a fast, efficient and cost-effective means to monitor, control and/or exchange information amongst networked devices such as printers, plotters, workstations, copiers, etc.

Communication networks that link computing devices (e.g., servers, workstations, etc.) and other devices (e.g., lights, sprinkler systems, printer, plotters, etc.) together are typically categorized and differentiated through characteristics such as size and user base, architecture, and topology. For example, a network can be referred to as a Local Area Network (LAN) or a Wide Area Network (WAN), dependent on the network size. A LAN is typically associated with a relatively small geographic area such as a department, a building or a group of buildings, and employed to connect local workstations, personal computers, printers, copiers, scanners, etc. while a WAN typically is associated with networks that span larger geographical areas, and can include one or more smaller networks, such as one or more LANs. For example, a WAN can be employed to couple computers and/or LANs that reside on opposite ends of a country and/or on opposite sides of the world. The most popular WAN today is the Internet.

Various types of communication protocols have been developed to facilitate communication between remotely located network devices. For instance, one common type of network based protocol is referred to as an internet protocol (IP). In an IP network, a source device generates data packets that include information (e.g., data to be delivered to a destination device, requests for certain data from a destination device, etc.) to be transmitted to a destination device, a source identifier that identifies the source of the data packet and a destination address associated with the destination device. Here, the source identifier and destination address fields in an IP packet are located in "framing" sections of the packet either before or after a data field. Hereinafter, unless indicated otherwise, the framing fields of an IP packet will be referred to as IP packet frames. Once an IP data packet is transmitted, network routers and hubs that receive the packet analyze the packet frames to identify the destination address, attempt to identify the most efficient way to deliver the packet to the destination device and then retransmit the packet to another network device until the packet arrives at the destination device. Here, the destination device is programmed to receive the packet, decode the packet information and typically perform some process associated with the decoded information. For instance, a first packet may be routed to a printer to print a document, a second packet may be routed to a light switch to turn on a light, a third packet may be routed to a stock brokerage server to request information about a client's account, etc. Examples of IP based networks include EtherNet/IP, EtherNet 10Base-T, 100Base-T (Fast EtherNet) and 1000Base-T (Gibabit EtherNet).

While IP networks have proven extremely useful in many applications, IP networks have several shortcomings that render the networks impractical for time sensitive applications. For instance, because IP network routing paths vary, the time required to transmit IP messages to destination devices varies appreciably. Similarly, excessive traffic over an IP network slows IP transmission rates so that packet delivery time is dependent on unpredictable factors. In addition, in at least some cases, servers that communicate via IP, enforce timeout rules wherein, if a packet has been transmitted from a source but the transmission period exceeds some threshold time period (e.g., due to network traffic), the message is discarded and has to be subsequently resent.

Thus, while IP networks are advantageous in applications where transmission time is not critical (e.g., a printing application, a request for information from a broker, sending an e-mail, etc.), IP networks have not been suitable in cases where information has to be transmitted almost instantaneously and at least within predictable time periods. Industrial controls is one application where unpredictable routing delays have rendered IP networks impractical in the past.

An exemplary industrial manufacturing line may include several machining stations (and associated devices and subassemblies—e.g., switches, sensors, motor starters, pushbuttons, I/O blocks, welders, robots, drives, bar code readers, etc.) along a transfer line, several programmable logic controllers (PLCs), one or more human-machine interfaces (HMIs) and a network that links the other components together where the PLCs are programmed to read inputs from stations and transfer line devices and provide outputs to the devices as a function of control programs stored in the PLCs. In many cases device and subassembly control at each station and between stations or between stations and the transfer line may have to be precisely synchronized in order for the line devices and assemblies to function properly and safely (e.g., a first robot arm could be damaged if the arm is driven into a line station prior to a second robot arm being removed from the station). Where device and subassembly timing is important, unpredictable IP network delays and periodic failures cannot be tolerated.

Early industrial control systems employed discrete signal wires between sensors and controllers and between controllers and actuators to ensure fast and predictable response times where control was modified by direct connection to the controller.

More recently, small groups of signal sensors and actuators have been tied to remote I/O concentrators where the concentrators have been networked to the controllers. In some cases, devices have been designed where network interfaces are embedded in the devices themselves. Exemplary devices of this type include DeviceNet and ControlNet devices that have been developed by Rockwell Automation. DeviceNet, ControlNet and other types of devices that include embedded network interfaces will be referred to generally hereinafter as non-IP devices.

In addition to developing non-IP devices suitable for use in industrial environments, industrial networking protocols have been developed for use with the non-IP devices where the industrial protocols use data packet formats that specify specific network paths from source devices to destination devices and therefore can transmit data in predictable time periods. One exemplary type of industrial protocol for use with DeviceNet and ControlNet devices is referred to as the control and information protocol or the common industrial protocol (CIP). Another exemplary non-IP protocol suitable for use with some types of industrial devices is referred to as Data Highway Plus. Other non-IP protocols are contemplated. Where an Ethernet links an HMI to a destination ControlNet or DeviceNet device through three additional ControlNet or DeviceNet devices (hereinafter "transmission path devices") arranged in a series, a CIP data packet will specify the packet source, information to be delivered to a destination device, the destination device address and a specific path through the networked devices from the source to the destination device.

Here, the path specification includes the addresses of each of the three intervening transmission path devices and the order in which the devices are linked. For instance, in the present example that includes a three device path and a destination device, the path data includes first, second and third transmission path device addresses and identifies the destination device address separately. During transmission of the CIP packet, the source routes the packet to the address of the first device in the path, the first device identifies the second path device address in the packet and routes the packet to the second address. The second path device identifies the third path device address in the packet and routes the packet to the third device address and the third device identifies the destination device address and routes the packet to the destination device to complete delivery of the packet. The specified path method used in CIP communication, unlike IP, results in a deterministic communication protocol that is suited for use in industrial environments.

Even more recently, for various reasons, industry members have adapted the specialized industrial network devices such as ControlNet and DeviceNet devices for use with open standards like Ethernet. For instance, in the case of CIP, CIP packets have been encapsulated within Ethernet or IP packet frames for routing via Ethernet. The result of this adaptation is that programming interfaces and sometimes controller to device interfaces are now communicating via Ethernet IP.

One advantage of non-IP devices like DeviceNet, ControlNet, etc., is that the devices can be configured into a non-IP network that is less expensive than a typical IP network as the need for network switches is eliminated. In addition, DeviceNet, ControlNet and other similar network configurations have intrinsic safety features that are not provided by an IP network. For this reason, in many cases, it is most advantageous to configure hybrid networks including some IP network devices and some non-IP network devices specially designed for industrial applications (e.g., DeviceNet, ControlNet devices).

While industrial control has historically been limited to confined and secure spaces such as within a manufacturing facility, in cases where pure Ethernet or hybrid networks (e.g., including a combination of IP and non-IP (e.g., DeviceNet, ControlNet) network devices) are used to route data between devices, the transparency of the Ethernet routing mechanism makes it possible to remotely monitor and control the networked industrial devices. The possibility for remote monitoring and control advantageously allows more flexible system layouts to be configured and reduces overall system costs where Ethernet infrastructure already exists to support other facility needs.

Unfortunately, one problem with pure Ethernet and hybrid networks is that the transparency of the Ethernet routing mechanism components presents security problems. For instance, where a LAN operated by a brokerage firm and including a server is linked to the Internet to allow customers to access account information, an unscrupulous computer hacker may attempt to access the LAN via an Internet connection to obtain information about one of the firm's client's accounts. As another instance, a hacker may maliciously attempt to access a banks software via the Internet to load a virus thereon that could scramble the bank's records and negatively affect the bank's business. As one other instance, a hacker may attempt to access a PLC and alter an industrial control program thereby causing damage to machine line components controlled by the PLC.

In addition to unscrupulous persons doing unsavory things via networked interfaces, in many cases even well intentioned network users may be able to unintentionally cause problems if they access networked devices. For instance, in the case of a maintenance engineer at a manufacturing facility, while the engineer may be trained to maintain a first type of manufacturing line, the engineer may not be trained to maintain a second type of manufacturing line. While in a facility including the first line, the engineer may have to be proximate the first line to perform diagnostics procedures, check operating values, etc., wherein the proximity requirement and visual feedback ensures that the engineer is accessing first line devices, not second line devices. Where remote access is facilitated via a pure Ethernet or hybrid system, proximity and visual feedback cannot be relied upon and the end result could be that the engineer unknowingly accesses second line devices rather than first line devices.

To ensure that unintended network access does not occur, information technology (IT) firewalls have been developed that, in effect, separate LANs and other sub-networks from the Internet and that operate as gatekeepers to keep unauthorized network users from accessing the sub-networks while still allowing access to authorized network users. To this end, a firewall generally intercepts attempts to access associated sub-networks and requires some type of proof of identity from a network user attempting to access the sub-networks prior to allowing access. Here, proof of identity may require entry of a user name and password or may be transparent to a network user (i.e., information transmitted from the user's interface device may indicate identity which is automatically identified by the firewall). Where a network user is not authorized to access a sub-network, the firewall restricts access and may perform some secondary security process such as creating a log, activating an alarm, etc.

While conventional IT firewalls work well in the context of pure IP communication, where a non-IP industrial protocol (e.g., CIP) is embedded within an IP or Ethernet frame, the embedded non-IP protocol could be used to perform unauthorized activities despite a properly functioning IT firewall. Here, when an IP or Ethernet packet including an embedded non-IP packet is received by a firewall, an IT firewall algorithm interrogates the IP packet frame information to determine if the packet should be passed through the firewall to a destination device identified in the IP packet frame. If, however, the destination device designated in the IP packet frame routes the packet further based on the non-IP routing information (e.g., addresses in an embedded CIP packet), the ultimate destination designated by the non-IP routing information is not protected. This "carry-through" routing is a concern whether the CIP packet is routed via Ethernet or some other native industrial network such as DeviceNet or ControlNet.

Thus, it would be advantageous to have a method and apparatus that allows devices linked to an IP network to access industrial and other devices linked to a non-IP network only when the accessing device or person using the accessing device has authority to access the destination device.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It has been recognized that network security problems can occur when additional routing information is encapsulated or embedded in the data field of an IP data packet that specifies a destination device or resource that is different than the destination device or resource specified in the IP packet frame. Specifically, where it is desired to restrict access to certain devices within a control configuration embedded routing information has enabled packets to be passed through conventional it firewalls enabling access to restricted devices.

According to at least some inventive aspects, firewalls are provided within a network wherein data packets received thereby are decapsulated so that at least an ultimate destination device or resource is identified. Access rules are applied to determine if the packet should be transmitted further to facilitate access or if a security function (e.g., discarding the packet, sending a reject message, activating an alarm, etc.) should be performed. In at least some cases all routing information is identified and analyzed and whenever any device in a routing path is not to be accessed for any reason, even if the ultimate destination device is accessible, the a security function is performed.

Consistent with the above, at least some embodiments of the invention include a method for selectively enabling communication of dual protocol packets from a source device directed to a service of an object class at target devices, the method comprising the steps of providing an access control database including at least one entry correlating a source device, an object class and a service of the object class; receiving a dual protocol packet communicated from a source device, the dual protocol packet including a frame and a field according to a first network communication protocol and an encapsulated packet of a second network communication protocol in the field; obtaining from the frame of the received dual protocol packet, according to the first network communications protocol, an identification of the source device; obtaining from the encapsulated packet, according to the second network communications protocol, an identification of an object class and a service of the object class to which the encapsulated packet is directed; comparing the identification of the source device, the identification of the object class and service of the object class, and the at least one entry of the access control database; and selectively transmitting the dual protocol packet as a function of the comparison.

In at least some cases the first network communications protocol is an IP network communications protocol.

In at least some cases the second network communications protocol is a CIP network communications protocol.

In at least some cases the comparison includes determining whether an entry of the access control database correlates the source device and the service of the object class obtained from the received dual protocol packet.

In at least some cases the dual protocol packet is selectively transmitted if an entry of the access control database correlates the source device and the service of the object class obtained from the received dual protocol packet.

In at least some cases the dual protocol packet is selectively transmitted if no entry of the access control database correlates the source device and the service of the object class obtained from the received dual protocol packet.

In at least some cases the identification of the source and object class to which the encapsulated packet is directed is obtained by decapsulating the dual protocol packet.

In at least some cases the identification of the source and object class to which the encapsulated packet is directed is obtained by decapsulating the encapsulated packet.

In addition, some inventive embodiments include a method for configuring a decapsulating firewall to selectively enable communication of dual protocol packets from a source device directed to a service of an object class at target devices, the method comprising the steps of providing a graphical user interface to a user which includes at least one control for making an entry in an access control database correlating a source device, an object class and a service of the object class; making an entry in the access control database correlating a source device, an object class and a service of the object class if a user operates the at least one control of the graphical user interface; and if at least one entry correlating a source device, object class and service of the object class has been made in the access control database, operating the decapsulated firewall by: receiving a dual protocol packet communicated from a source device, the dual protocol packet including a frame and a field according to a first network communication protocol and an encapsulated packet of a second network communication protocol in the field; obtaining from the frame of the received dual protocol packet, according to the first network communications protocol, an identification of the source device; obtaining from the encapsulated packet, according to the second network communications protocol, an identification of an object class and a service of the object class to which the encapsulated packet is directed; comparing the identification of the source device, the identification of the service of the object class and the at least one entry of the access control database; and selectively transmitting the dual protocol packet as a function of the comparison.

In at least some cases the first network communications protocol is an IP network communications protocol.

In at least some cases the second network communications protocol is a CIP network communications protocol.

In at least some cases the comparison includes determining whether an entry of the access control database correlates the source device and the service of the object class obtained from the received dual protocol packet.

In at least some cases the dual protocol packet is selectively transmitted if an entry of the access control database correlates the source device and the service of the object class obtained from the received dual protocol packet.

In at least some cases the dual protocol packet is selectively transmitted if no entry of the access control database correlates the source device and the service of the object class obtained from the received dual protocol packet.

In at least some cases the identification of the source and object class to which the encapsulated packet is directed is obtained by decapsulating the dual protocol packet.

In at least some cases the identification of the source and object class to which the encapsulated packet is directed is obtained by decapsulating the encapsulated packet.

In addition, some inventive embodiments include an apparatus for selectively enabling communication of dual protocol packets from a source device directed to a service of an object class at target devices. An apparatus can comprise a firewall programmable to perform the steps of: providing an access control database including at least one entry correlating a source device, an object class and a service of the object class; receiving a dual protocol packet communicated from a source device, the dual protocol packet including a frame and a field according to a first network communication protocol and an encapsulated packet of a second network communication protocol in the field; obtaining from the frame of the received dual protocol packet, according to the first network communications protocol, an identification of the source device; obtaining from the encapsulated packet, according to the second network communications protocol, an identification of an object class and a service of the object class to which the encapsulated packet is directed; comparing the identification of the source device, the identification of the object class and service of the object class, and the at least one entry of the access control database; and selectively transmitting the dual protocol packet as a function of the comparison.

In at least some cases the first network communications protocol is an IP network communications protocol and the second network communications protocol is a CIP network communications protocol.

In at least some cases the comparison includes determining whether an entry of the access control database correlates the source device and the service of the object class obtained from the received dual protocol packet.

In at least some cases the identification of the source and object class to which the encapsulated packet is directed is obtained by decapsulating the encapsulated packet.

Further, and consistent with the above, at least some embodiments of the invention include a method for use with a system including networked resources where communication between resources is via at least first and second protocols wherein the first protocol includes a first protocol packet including a source identifier, a first protocol destination identifier that indicates a first protocol destination resource and a first protocol data field, the second protocol including a second protocol packet including at least one second protocol destination identifier that indicates a second protocol destination resource and a second protocol data field, wherein at least some communication between resources includes first protocol packets including second protocol packets embedded in the first protocol data fields, packet transmitting and receiving resources being source and destination resources, respectively, the method for controlling communication between resources and comprising the steps of: specifying access control information for at least a subset of the resources where the access control information includes at least one of characteristics of first protocol packets that are authorized to be transmitted to an associated resource and characteristics of first protocol packets that are unauthorized to be transmitted to an associated resource, for each first protocol packet transmitted on the network that includes a second protocol packet embedded in the first protocol data field: (i) intercepting the first protocol packet prior to the first protocol destination resource; (ii) examining at least a subset of the embedded second protocol packet information to identify the second protocol destination resource; (iii) identifying the access control information associated with the second protocol destination resource, (iv) identifying at least a subset of characteristics of the first protocol packet, (v) comparing the first protocol packet characteristics to the access control information associated with the second protocol destination resource and (vi) restricting transmission of the first protocol packet as a function of the comparison results.

In at least some cases the step of specifying access control information includes, for each of at least a subset of destination resources, specifying source resources authorized to communicate with the destination resource. In some cases the step of identifying at least a subset of the characteristics of the first protocol packet includes identifying the source of the first protocol packet and the step of comparing the first protocol packet characteristics to the access control information associated with the destination resource includes comparing the source of the first protocol packet to the resources authorized to communicate with the destination resource. In some embodiments the step of restricting includes, when the first protocol packet source is not authorized to access the second protocol destination resource, halting transmission of the first protocol packet. In still other embodiments the step of restricting includes, when the first protocol packet source is not authorized to access the second protocol destination resource, at least one of activating an alarm signal and providing a signal back to the source indicating that the packet has been halted.

In some cases, the step of specifying access control information includes specifying packet characteristics (PCs) that include characteristics identifiable directly from the first protocol packet.

In some cases the step of specifying access control information includes specifying non-packet characteristics (NPQs) that include characteristics other than those identifiable directly from the first protocol packet. Here, the NPQs may include at least a subset of a time associated with the first protocol packet transmission, the location of the source resource, where a person initiates the first protocol packet transmission, the identity of the initiating person and, where a person initiates the first protocol packet transmission, characteristics of the initiating person.

In some embodiments the step of specifying access control information further includes specifying times during which resources can communicate with other resources, the method further including the step of, when a first protocol packet that includes an embedded second protocol packet is received, identifying a time associated with the received packet, the step of comparing including comparing the packet associated time with the specified times.

In some cases the first protocol is one of an Ethernet protocol and an IP protocol. In some cases the second protocol is one of a common industrial protocol (CIP) and a Data Highway Plus protocol. In some cases the steps of specifying at least first and second priorities for network transmissions and, wherein, the step of restricting transmission includes transmitting as a function of the specified priorities and the packet characteristics.

In some additional embodiments the step of specifying access control information includes the step of specifying locations of source resources from which communications with associated resources are allowed, the method further including the step of identifying the location of a source resource that transmits a first protocol packet that includes an embedded second protocol packet and the step of comparing further including comparing the identified source resource location with the specified source resource location.

In some cases each destination resource includes at least one of a programmable logic controller (PLC), a human-machine interface (HMI), a sensor, an actuator, a drive, and a remote input/output device. In some cases the step of specifying access control information includes specifying characteristics of persons authorized to communicate with associated resources, the step of identifying at least a subset of the characteristics of the first protocol packet including identifying characteristics of a person that initiates a communication and the step of comparing including comparing the specified and identified characteristics.

In some embodiments the embedded protocol packet specifies a path of resources to a final destination resource, the method further including identifying access control information associated with each of the path resources, comparing the first protocol packet characteristics to the access control information associated each of the path resources resource and restricting transmission of the first protocol packet as a function of the results of the comparison to the access control information associated with the path resources.

In addition, some inventive embodiments include a method for use with a system including networked resources where communication between resources is via at least first and second protocols wherein the first protocol includes a first protocol packet including a source identifier, a first protocol destination identifier and a first protocol data field, the second protocol including a second protocol packet including at least one second protocol destination identifier and a second protocol data field, wherein at least some communication between resources includes first protocol packets including second protocol packets embedded in the first protocol data fields, packet senders and intended recipient's being source and destination resources, respectively, the method for controlling communication between resources and comprising the steps of specifying access control information for at least a subset of the resources where the access control information includes at least one of characteristics of first protocol packets that are authorized to be transmitted to an associated resource and characteristics of first protocol packets that are unauthorized to be transmitted to an associated resource, for each first protocol packet transmitted on the network that includes a second protocol packet embedded in the first protocol data field: (i) intercepting the first protocol packet prior to the second protocol destination resource, (ii) examining at least a subset of the embedded second protocol packet information to identify the second protocol destination resource, (iii) examining the first protocol packet information to identify at least one additional resource in addition to the second protocol destination resource, (iv) identifying the access control information associated with the second protocol destination resource and the access control information associated with the additional resource, (v) identifying at least a subset of characteristics of the first protocol packet, (vi) comparing the first protocol packet characteristics to the access control information associated with the second protocol destination resource and comparing the first protocol packet characteristics to the access control information associated with the additional resource and (vii) restricting transmission of the first protocol packet as a function of the comparison results. Here, the additional resource may be the first protocol packet destination resource. In the alternative, the second protocol packet may specify at least one path resource to the second protocol packet destination resource through which data is to be routed between the first and second protocol packet destination resources and the step of identifying at least one additional resource may include identifying the at least one path resource.

In addition, some embodiments include a method for use with a system including networked resources where communication between resources is via at least first and second protocols wherein the first protocol includes a first protocol packet including a source identifier, a first protocol destination identifier and a first protocol data field, the second protocol including a second protocol packet including at least one second protocol destination identifier and a second protocol data field, wherein at least some communication between resources includes first protocol packets including second protocol packets embedded in the first protocol data fields, packet senders and intended recipient's being source and destination resources, respectively, the method for controlling communication between resources and comprising the steps of specifying access control information for at least a subset of the resources where the access control information includes at least one of characteristics of first protocol packets that are authorized to be transmitted to an associated resource and characteristics of first protocol packets that are unauthorized to be transmitted to an associated resource, for each first protocol packet transmitted on the network that includes a second protocol packet embedded in the first protocol data field, intercepting the first protocol packet prior to the second protocol destination resource, examining at least a subset of the embedded second protocol packet information to identify the second protocol destination resource, examining the first protocol packet information to identify at least one additional resource in addition to the second protocol destination resource, identifying the access control information associated with the second protocol destination resource and the access control information associated with the additional resource, identifying at least a subset of characteristics of the first protocol packet, comparing the first protocol packet characteristics to the access control information associated with the second protocol destination resource and comparing the first protocol packet characteristics to the access control information associated with the additional resource and restricting transmission of the first protocol packet as a function of the comparison results.

In at least some cases the additional resource is the first protocol packet destination resource. In at least some cases the second protocol packet specifies at least one path resource to the second protocol packet destination resource through which data is to be routed between the first and second protocol packet destination resources and wherein the step of identifying at least one additional resource includes identifying the at least one path resource.

Moreover, some embodiments include a method for controlling communications between a source device linked to an IP network and a target device linked to a non-IP network wherein the target device includes at least one object, each communication specify at least one object and at least one service related to the target device, the method comprising the steps of providing an access control database that correlates the source device with target devices, objects and services where the correlated target devices include devices that the source can access and the correlated services include services that the source can initiate at the correlated object, receiving at least one communication transmitted from the source to the target device, decapsulating the communications to identify the target device and related at least one object and the at least one service, comparing the identified target device, at least one object and at least one service with the target device, object and service information in the database and selectively transmitting the at least one communication to the target device as a function of the comparison.

In at least some cases the correlated object includes a combination of a class, an instance of a class, an attribute of a class and an attribute of an instance of a class.

Furthermore, some embodiments include a method for controlling communications between a source device and a target device, the method comprising the steps of providing an access control database that correlates the source device with target devices where the correlated target devices include devices that the source can access for at least one purpose, providing a firewall between the source device and the target device, intercepting a connection open packet transmitted by the source device to the target device that is intended to open a connection path between the source and the target devices, using the access control database to determine if the source device may access the target device and transmitting the connection open packet toward the target device when the source device may access the target device.

In addition, some embodiments include a method for minimizing processing delays when unauthorized communications occur on a system that includes a source device, a target device and a communication stack, the source device sequentially generating and transmitting communication packets for each of the stack communications and, after a packet is transmitted, waiting for a response packet for at least a subset of the communications prior to transmitting another communication packet associated with another of the stack communications, the method comprising the steps of providing a firewall linked to the system, transmitting an original communication packet from the source device that targets the target device, via the firewall intercepting the original communication packet, encapsulating a spoof response packet that simulates a response from the target device and that is of a form that will be accepted by the source device as a legitimate response from the target device, transmitting the spoof response packet to the source device and, via the source, accepting the spoof response packet as a legitimate response packet from the target device and moving on to process the next communication in the stack.

In some cases the method further includes the steps of providing an access control database useable to identify unauthorized communications on the system and after intercepting the original communication packet and prior to encapsulating, using the access control database to identify that the communication packet is associated with an unauthorized communication.

In some cases the step of encapsulating includes obtaining at least some information from the original communication packet and using the obtained information to instantiate at least a subset of the response packet. In some cases the original request packet includes a target-originator (T-O) ID and wherein the obtained information includes the T-O ID from the original request packet.

In some cases the obtained information includes information identifying the source device and information identifying the target device. In some cases the step of encapsulating further includes generating at least some bogus information to instantiate at least a subset of the response packet information and instantiating at least portions of the response packet with the bogus information. In some cases the step of encapsulating further includes generating at least some bogus information to instantiate at least a subset of the response packet information and instantiating at least portions of the response packet with the bogus information.

At least some embodiments include a method for use with a system including networked resources where communication between resources is via at least first and second different protocols wherein the first protocol includes a first protocol packet including a source identifier, a first protocol destination identifier that indicates a first protocol destination resource and a first protocol data field, the second protocol including a second protocol packet including at least one second protocol destination identifier that indicates a second protocol destination resource and a second protocol data field, wherein at least some communication between resources includes first protocol packets including additional packets embedded in the first protocol data fields, one of the additional embedded packets specifying a final destination resource and each of the other additional embedded packets specifying an intermediate path resource, at last one of the additional embedded packets being a second protocol packet, the method for controlling communication between resources and comprising the steps of specifying access control information for at least a subset of the resources, for each first protocol packet transmitted on the network that includes additional embedded packets, (i) intercepting the first protocol packet prior to the first protocol destination resource, (ii) examining at least a subset of the additional embedded packet information to identify at least one of the intermediate path resources and the final destination resource, (iii) identifying the access control information associated with the identified at least one of the intermediate path resources and the final destination resource and (iv) restricting transmission of the first protocol packet as a function of the identified access control information.

Here, in some cases the step of restricting transmission includes identifying at least a subset of characteristics of the first protocol packet, comparing the first protocol packet characteristics to the identified access control information and restricting transmission as a function of the comparison. In some cases the step of examining includes examining to identify each of the intermediate path resources and the final destination resource and wherein the step of identifying access control information further includes identifying access control information for each of the intermediate path resources and the final destination resource.

In some cases each of the additional embedded protocol packets is of the second type. In some embodiments the step of identifying at least a subset of characteristics of the first protocol packet includes identifying at least a subset of the characteristics of each of the first and the embedded protocol packets. In some cases the access control information includes at least one of characteristics of first protocol packets that are authorized to be transmitted to an associated resource and characteristics of first protocol packets that are unauthorized to be transmitted to an associated resource.

In some embodiments the at least one protocol packet generated by a first protocol packet source requires a response from at least one of the intermediate path resources and the final destination resource including specific identifying information and wherein step of restricting includes, when a first protocol packet source is not authorized to communicate with the second protocol destination resource, encapsulating the specific identifying information in a response packet and transmitting the response packet to the first protocol packet source.

At least some embodiments also include apparatus for performing the processes described above and hereafter.

The following description and annexed drawings set forth in detail certain illustrative aspects of the present invention. These aspects are indicative, however, of but a few of the various ways in which the principles of the invention may be employed and the present invention is intended to include all such aspects and their equivalents. Other advantages and novel features of the present invention will become apparent from the following detailed description of the invention when considered in conjunction with the drawings.

BRIEF DESCRIPTION OF THE SEVERAL VIEWS OF THE DRAWINGS

The invention will hereafter be described with reference to the accompanying drawings, wherein like reference numerals denote like elements, and:

FIG. 10 is an access control database similar to the database of FIG. 3, albeit illustrating a more complex embodiment wherein, in addition to user identity, other non-packet characteristics are included, priority information is included and specific application restrictions are included;

FIG. 32 is a sub-process that may be substituted for a portion of the method of FIG. 20 for generating a spoofed response packet.

DETAILED DESCRIPTION OF THE INVENTION

Figure 1:
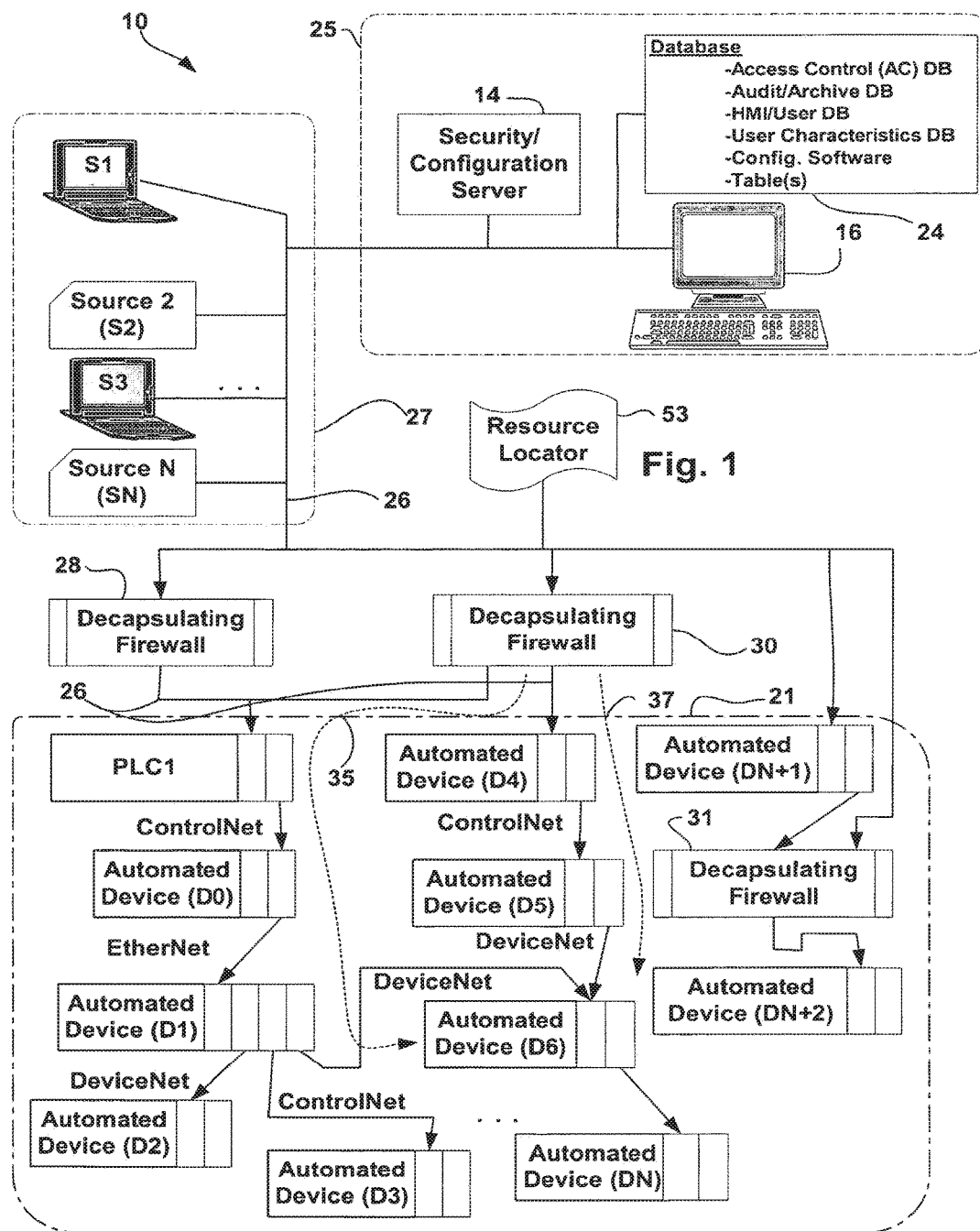
FIG. 1 is a schematic view of a system including firewalls according to at least some aspects of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used herein, the term "device," or "resource" is intended to refer to a computer-related entity, either hardware, a combination of hardware and software, software, or software in execution. For example, a device can be, but is not limited to, a process running on a processor, a processor, an object, an executable, a thread of execution, a program, a microprocessor, a processing unit and/or a computer, and hardware (e.g., a sensor or actuator) performing a process, etc.

Referring now to FIG. 1, the present invention will be described in the context of an exemplary system 10 including a security subsystem 25, source devices collectively identified by numeral 27, a series of decapsulating firewalls, three of which are identified by numerals 28, 30 and 31, and an industrial control configuration 21 including a plurality of industrial control devices such as programmable logic controller PLC1 and automated devices including devices D1, D2, D3, etc. The industrial control devices (e.g., PLC1, devices D1, D2, etc.) are arranged in a manufacturing facility or the like to perform some industrial process. For example, the devices may be arranged to automatically assemble automobile seat components including cushions, springs, motors, rollers, support mechanisms, headrest extensions, covering material, etc. In this regard, in addition to PLCs to control other devices, devices may includes sensors, actuators, data collecting processors and devices, input/output concentrators, etc.

To facilitate control, monitoring exchange of data and configuring of the devices, the configuration 21 devices are linked via a network as illustrated. For example, referring again to FIG. 1, automated device D6 is linked to automated device D1, device D1 is linked to device D0 and device D0 is linked to PLC1. Similarly, device D6 is linked to device D5 and device D5 is linked to device D4. As illustrated, more than one device can be linked to another device. For instance, each of devices D2, D3 and D6 are linked to different output ports of device D1. Although only a small number of industrial control devices are illustrated in FIG. 1, it should be appreciated that, in many applications, several thousand devices may be linked together to form an intricate web of control components for facilitating complex industrial processes.

Each of the devices D0, D1, D2, etc. is assigned a specific network address and includes a processor capable of identifying network communications transmitted to the associated address. In addition, the device processors are programmed to examine received information packets to identify if the device is the final destination device or simply one device in a transmission path to some other destination device. Where the device is the final destination device, the processor uses packet data to perform some associated process. Where the device is not the final destination device, the processor transmits at least a portion of the received packet information to the next device in the transmission path.

As known in the automation industry, industrial control components may be of various network types, including, but not limited to, EtherNet, DeviceNet, ControlNet, etc. For instance, in FIG. 1, device D4 communicates with device D5 via ControlNet while device D5 communicates with device D6 via DeviceNet and device D1 communicates with device D2 via EtherNet. Also, as illustrated, one device may be capable of communicating in several different protocols, depending on the next device to which a packet is to be routed. For instance, device D1 communicates via a DeviceNet protocol with each of devices D2 and D6 but communicates via a ControlNet protocol with device D3.

In general, non-IP protocols are different than IPs in the way in which packets of information that facilitate the protocol are formed and the way in which networked devices use the packet information to route to a final destination device. In this regard, while IPs typically specify a packet source and a destination device and rely on routers and switches to deliver information packets from a source to a destination device, non-IPs specify a specific network path through a chain of devices for delivering information packets from a source to a destination device. For example, referring once again to FIG. 1, to deliver a packet from firewall 30 to automated device DN, a non-IP packet may specify a path 37 including device D4, device D5, device D6, and so on all the way through to device DN. Here, when device D4 receives the CIP packet, device D4 recognizes that the packet should be transmitted to device D5 and performs that transmission. Similarly, when device D5 receives the packet, device D5 determines that the packet should be transferred to device D6 and performs that transmission. This process continues until the packet is received by device DN. A second exemplary path 35 through PCL1, and devices D0, D1, D6, etc. to device DN is illustrated. In FIG. 1, communications that originate outside configuration 21 are IP communications and the network over which those communications travel is referred to as an IP network 26 and communications that originate within confirmation 21 are referred to as non-IP communications (e.g., CIP communications, Data Highway Plus, etc.) and the network (not labeled) is referred to as a non-IP network.

Referring still to FIG. 1, sources 27 include any type of component that may be used to attempt to access any of the industrial control components or devices included in control configuration 21. Here, the term "access" is used in a general sense to refer to the ability to monitor, control, configure and/or obtains information from a destination device. In addition, each source 27, etc. may also be used to access other devices linked to IP network 26 via pure IP communications. Exemplary sources S2, SN may include data monitoring and archiving servers, maintenance servers that analyze data obtained from system components and devices other IP or non-IP networks including other devices, servers that perform control and safety operations with respect to system components and devices, etc.

In addition, at least some of the sources may include human-machine interfaces (HMIs) to enable information technology personnel, maintenance personnel, an administrative person, etc., to access system devices and components. For example, illustrated sources S1 and S3 are laptop computers that run browser software to interact with laptop users to facilitate access to configuration 21 devices. Other exemplary HMIs may include an electronic notepad, a personal computer, a palm pilot, a hand-held computer, a personal digital assistant, a mainframe computer, a cell phone, a "dumb" terminal, a tablet PC, etc. Hereinafter, laptop S1 will be referred to as HMI S1 and a person using HMI S1 will be referred to as a "user" unless indicated otherwise. Similarly, laptop S3 will be referred to as HMI S3. In addition, while sources S2, SN, etc. may access or attempt to access configuration 21 devices either automatically (e.g., to periodically collect and archive operating data) or when a user performs some activating process, to simplify this explanation, access restriction will be described in the context of HMI S1 unless indicated otherwise. Moreover, while HMI S1 could be used to attempt to access any of configuration 21 devices, unless indicated otherwise, the present inventions will be described in the context of activity that causes HMI S1 to attempt to access device DN via path 37 (e.g., through devices D4, D5, D6, etc.).

Referring still to FIG. 1, HMI S1 accesses control devices in configuration 21 by forming and transmitting IP data packets via IP based network 26 that include information necessary to deliver the packets to the destination devices. To this end, because system 10 components between HMI S1 and a destination device within configuration 21 communicate using both IP and non-IP, the data packet generated by HMI S1 to access an industrial control device must include information that facilitates both routing on IP network 26 to a device at the "edge" of the IP network and subsequent routing via the non-IP network between configuration 21 devices.

Figure 2:
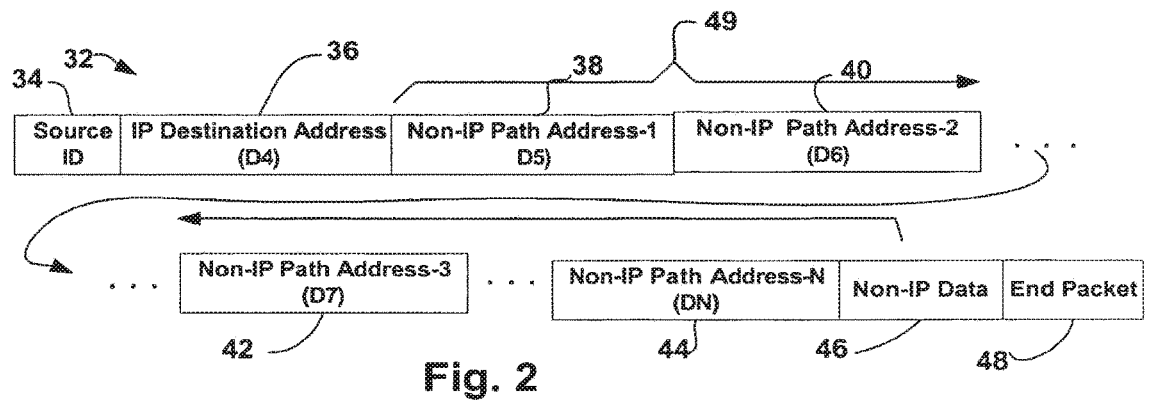
FIG. 2 is a schematic view of an exemplary dual protocol data packet including a non-IP data packet embedded or encapsulated within an IP type data packet.

Referring now to FIG. 2, an exemplary data packet 32 that may be generated by HMI S1 in FIG. 1 to access one of the industrial control devices in configuration 21 is illustrated. Exemplary packet 32 is a typical IP packet and, to that end, includes a frame that specifies packet source and destination device and a data field within the frame. In FIG. 2, the IP packet frame includes a source IP field 34 and an IP destination address field 36 as well as an end packet field 48. The IP packet data field is identified by numeral 49 in FIG. 2 and includes fields 38, 40, 42, 44 and 46 as illustrated. As the label implies, source ID field 34 includes information that identifies the packet source. For example, referring again to FIG. 1, where HMI S1 generates a packet, the information in field 34 identifies HMI S1 as the source of the packet. Similarly, where source S2 generates a packet, field 34 identifies source S2 as the source of the packet.

IP destination address field 36 includes an address corresponding to a destination device for the IP packet where the destination device is at the edge of the IP network. Here, IP destination devices can only be devices that are directly linked to the IP network and that are capable of receiving IP packets. For example, referring again to FIG. 1, an exemplary IP target device linked to network 26 may include device D4, device DN+1 or PLC1 while devices D1, D5, etc., that are not directly linked to the IP network 26 are not capable of being IP target devices.

Referring still to FIG. 2, IP data field 49 is where data for delivery to a destination address is typically located. In the present case, a non-IP data packet is encapsulated in field 49 where the packet includes non-IP path device address fields 38, 40, 42 and 44 and a non-IP data field 46. The non-IP address fields 38, 40, 42 and 44 specify a string of addresses corresponding to non-IP devices and specify a path for non-IP routing. Data field 46 includes information that is to be delivered to the control device associated with the address specified in the last non-IP address field (e.g., field 44) of packet 32.

Referring still to FIGS. 1 and 2, an exemplary data packet 32 will be described in the context of a case where a user logs on to HMI S1 and performs some activity that requires HMI S1 to transmit data to device DN. For instance, where device DN is a temperature sensor, the HMI S1 user may use HMI browser software to request the current temperature reading of sensor DN which causes HMI S1 to transmit a temperature read request to device DN.

Once HMI activity requires data transmission to device DN, an HMI S1 processor generates an information packet like packet 32 in FIG. 2 that identifies HMI S1 as the source in field 34. In addition, in at least some cases, the packet will include the address of automated device D4 in the IP destination address field 36 and will include the addresses of devices D5 and D6 through DN in non-IP path address fields 38, 40, 42 and 44. The data to be delivered to device DN to facilitate access (e.g., to facilitate a temperature read in the above example) is stored in field 46. Here, when the exemplary packet 32 is transmitted by HMI S1, IP network 26 identifies the IP destination address in field 36 and delivers the packet to device D4. When device D4 receives the packet, device D4 decapsulates the packet to identify the address of the next device in the path leading to device DN (i.e., identifies the address specified in field 38). In addition, device D4 determines the device type of device D5 (e.g., a ControlNet device, a DeviceNet device, etc.) Once the address in field 38 has been identified, device D4 recapsulates the data in fields 40, 42, 44 and 46 in a manner that is understandable by the next path device. In the present example, as illustrated, device D5 is a ControlNet device and therefore the protocol used to communicate from device D4 to device D5 is ControlNet and therefore the information in fields 40, 42, 44, and 46 is recapsulated in a manner consistent with the ControlNet protocol. Next, device D4 transmits the recapsulated ControlNet packet to device D5.

When device D5 receives the packet, device D5 decapsulates the packet to identify the address specified in field 40 and also determines what type of device is associated with the next path address. After identifying the address specified in field 40 and device type, device D5 recapsulates the information in fields 42, 44 and 46 to form a packet having a form consistent with the protocol used to communicate from device D5 to the device specified in field 40 (see again FIG. 2). As illustrated in FIG. 1, the DeviceNet protocol is used to communicate from device D5 to device D6. The recapsulated packet is transmitted to device D6. This process of decapsulating to identify the next non-IP device in a path and then recapsulating and transmitting the recapsulated packet to the next non-IP device in the path continues until data is received at the destination device DN.

To form a dual protocol IP and non-IP type packet like the one described with respect to FIG. 2, each source 27 has to have access to information about configuration 21 from which appropriate required paths to destination devices can be determined. Here, the configuration information may be downloaded to a source like HMI S1 whenever the source is initially linked to network 26. In the alternative, the HMI S1 (or any other source for that matter) may be programmed to browse configuration 21 and discover all devices and linkages within configuration 21. Here, for instance, HMI S1 may be programmed to identify each device within configuration 21 that is directly linked to network 26 and thereafter, via dual protocol packets, cause each identified device to identify other devices linked thereto.

Similarly, when a new device is added to configuration 21, any one of the sources 27 may be programmed to identify the new device and update configuration 21 information for that source or for any of the other sources 27. In this regard, to identify newly linked devices, one of the sources may be programmed to periodically pull network devices to identify changes in configuration 21.

In at least some cases, it is contemplated that, while it may be advantageous to allow sources 27 to access some of the industrial control devices within a system 10 and perform various activities with respect thereto, in at least some cases, it will be necessary to restrict access and activities of one or more of the sources 27. For instance, where HMI S1 is only used by maintenance personnel trained to analyze data associated with devices D4, D5, D6 through DN and to control those devices, it would be advantageous to restrict HMI S1 users so that HMI S1 cannot be used to access other system 10 devices (e.g., PLC1, devices D1, D2, etc.).

Referring again to FIG. 1, to restrict access to system devices according to one aspect of the present invention, decapsulating firewalls, three of which are identified by numerals 28, 30 and 31, are provided. Exemplary firewalls 28, 30 and 31 are provided within system 10 to isolate subsets of the non-IP devices from sources 27. For example, firewall 28 is provided to isolate PLC1 as well as devices D0, D1, D2, D3 and D6 through DN from sources 27. Similarly, firewall 30 isolates devices D4, D5 and D6 through DN from sources 27 while firewall 31 isolates device DN+2 from sources 27. As illustrated, firewall 30 may also be programmed to act as a redundant firewall to isolate PLC1 and devices D1, D2 and D3 from sources 27.

Referring still to FIG. 1, while firewalls 28 and 30 are linked directly to IP network 26 and are outside control configuration 21, in at least some cases it is contemplated that firewalls may be provided within the non-IP network or configuration 21 itself so that access to non-IP devices isolated thereby is restricted by the firewall while access to other non-IP devices outside the firewall is not restricted by the firewall. For example, in FIG. 1, firewall 31 between non-IP devices DN+1 and DN+2 isolates and restricts access to device DN+2 and does not restrict access to device DN+1. In FIG. 1, while firewall 31 is within configuration 21, IP network 26 is linked directly to firewall 31 to allow server 14 and firewall 31 to communicate.

In addition, it is also contemplated that multiple levels of firewalls could be interspersed within the non-IP network to provide different levels of access restriction. Thus, for instance, although not illustrated, referring to FIG. 1, another firewall could be positioned between devices D5 and D6 to further restrict access to devices D6 through DN.

Referring once again to FIG. 1, security subsystem 25 includes a security/configuration server 14 that is linked to an HMI (e.g., a personal computer) 16 and a database 24. In addition, server 14 is linked to IP network 26. Among other databases, database 24 includes an access control (AC) database which, as the label implies, includes rules that establish which industrial control devices within configuration 21 can be accessed via each source 27.

Figure 3:
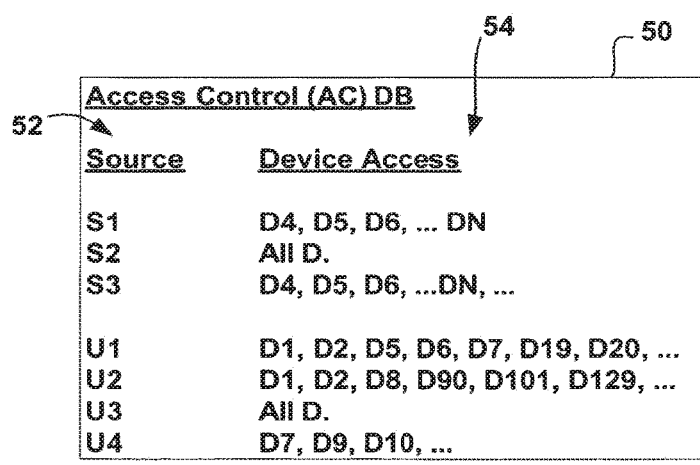
FIG. 3 is a schematic view of an exemplary simple access control database that may be used by the firewalls of FIG. 1.

Referring now to FIG. 3, an exemplary simplified AC database 50 is illustrated. Database 50 includes a source column 52 and a device access column 54. Source column 52 lists each one of the sources 27 in FIG. 1, and therefore, includes sources S1, S2 and S3 through SN. Device access column 54, as the label implies, lists a subset of the control devices for each one of the sources in column 52 where the list of devices indicates the devices that may be accessed by the associated source in column 52. For example, for HMI S1 in column 52, access column 54 lists devices D4, D5, D6 through DN. As another example, for source S2, access column 54 includes an entry "All DN" which indicates that source S2 can access all control devices within configuration 21.

Figure 4:
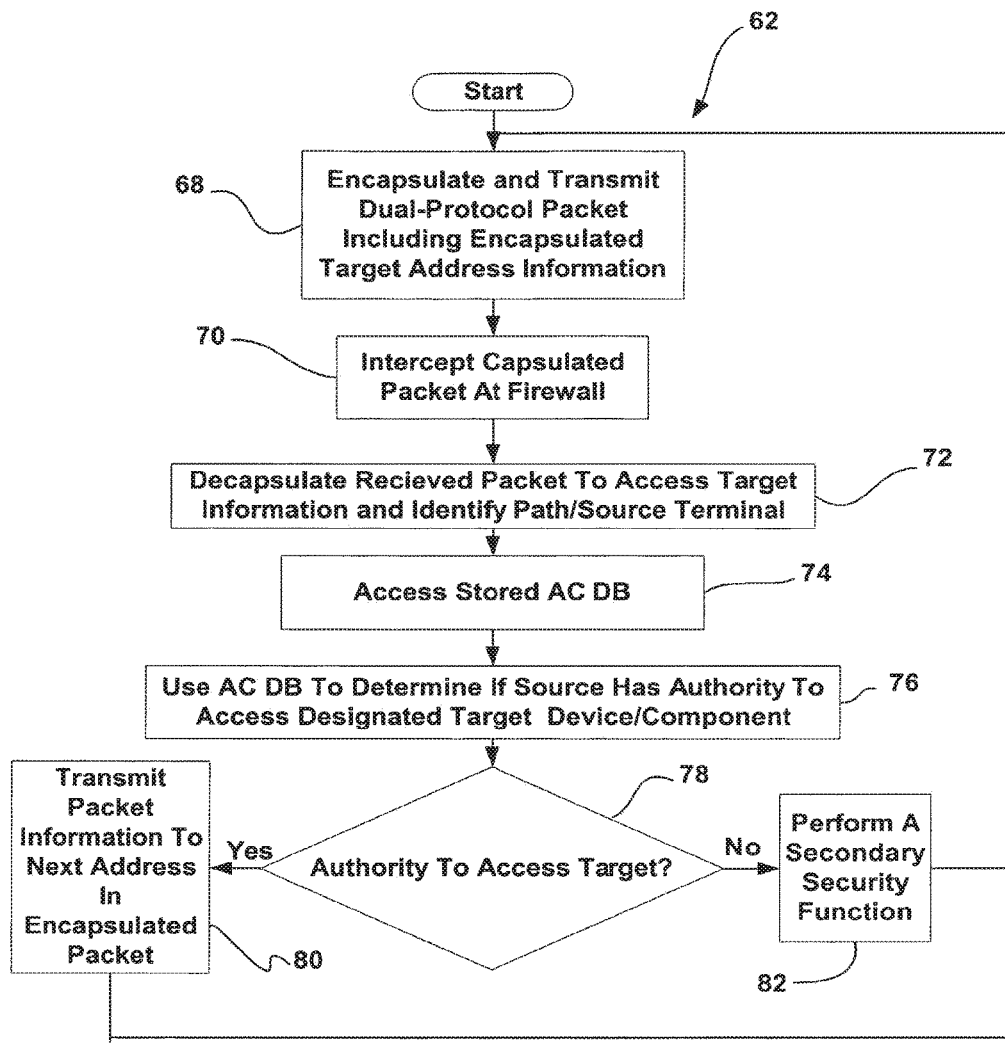
FIG. 4 is a flow chart illustrating an exemplary access control restricting method wherein access to control devices is limited as a function of which source is used to attempt the control.

Referring now to FIG. 4, an exemplary access restricting method 62 according to at least some of the aspects of the present invention is illustrated where non-IP network access is restricted as a function of source device as well as destination device. Referring also to FIGS. 1 and 3, prior to beginning method 62, it is assumed that an access control database 50 that specifies source and device access authority is stored in database 24 and that decapsulating firewalls 28, 30 and 31 have been provided. Referring also to FIG. 2, at block 68, herein it is assumed that a user of HMI S1 performs an activity that causes HMI S1 to encapsulate and transmit a dual protocol data packet 32 including encapsulated destination address information where the ultimate destination device is device DN. Thus, here, the data packet assembled by HMI S1 identifies source S1 in field 34 and the addresses of devices D4, D5 and D6 through DN in fields 36, 38, 40, 42 and 44, respectively. Data to be delivered to device DN is stored in data field 46.

Referring to FIGS. 1 through 4, at block 70, prior to the packet 32 being received at device D4, the packet is intercepted at firewall 30. At block 72, firewall 30 decapsulates the received packet and identifies the device addresses in each of fields 36, 38, 40, 42 and 44 as well as the source S1 specified in field 34. Next, at block 74, firewall 30 accesses the access control database 50. At block 76, firewall 30 uses access control database 50 to determine if HMI S1 has authority to access the designated destination device DN. At decision block 78, where HMI S1 has authority to access designated destination device DN, control passes to block 80 where firewall 30 transmits the data packet to the IP target address specified in field 36. In the present example, the IP target address designates device D4 and therefore, at block 80, the packet is transmitted to device D4. Referring again to FIG. 1, after the packet is received by device D4, routing consistent with non-IP network procedures continues until the packet data is delivered to the designated destination device DN.

Referring once again to block 78, were HMI S1 is not authorized to access designated destination device DN, control passes to block 82 where firewall 30 performs a secondary security function. After each of blocks 80 and 82, control passes back up to block 68 and the process is repeated for the next encapsulated and transmitted dual protocol data packet.

Figure 5:
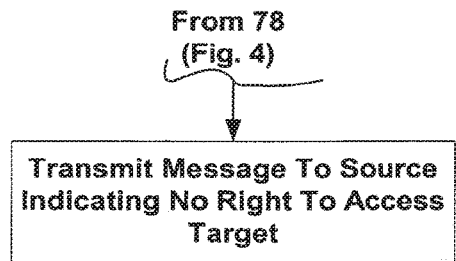
FIG. 5 is a flow chart illustrating one exemplary secondary function that may be substituted for a portion of the method of FIG. 4.

Referring to FIG. 5, a secondary security function 56 that may be substituted for block 82 in FIG. 4 is illustrated. To this end, referring also to FIG. 4, after block 78, if HMI S1 is not authorized to access destination device DN, control passes to block 56 where firewall 30 transmits a message to HMI S1 indicating that the HMI S1 has no right to access destination device DN. After block 56, control passes back to block 68 and the method described above with respect to FIG. 4 continues.

Figure 6:
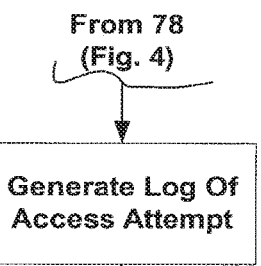
FIG. 6 is similar to FIG. 5, albeit illustrating a different secondary security function.

Referring to FIG. 6, another exemplary secondary security function 58 that may be substituted for block 82 in FIG. 4 is illustrated. Referring also to FIG. 4, if the HMI S1 is not authorized to access destination device DN, control passes from block 78 to block 58 where firewall 30 generates a log or archive that reflects the communication attempt. Referring also to FIG. 1, the log is recorded in an audit/archive database which forms part of database 24. An exemplary log may identify various types of information about the attempted access including the source used to attempt access, information identifying the data from the packet, information identifying the path specified by the packet, the time at which the attempted access occurred, where more than one attempt to access occurs, the number of attempts, etc. After block 58, control again passes to block 68 in FIG. 4 where the process described above continues.

Figure 7:
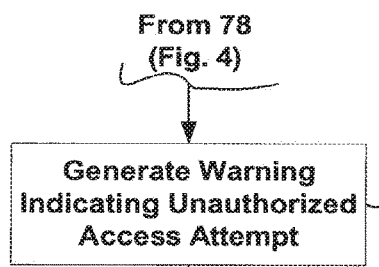
FIG. 7 is similar to FIG. 5, albeit illustrating a third security function.

Referring to FIG. 7, one other secondary security function 60 that may be substituted for block 82 in FIG. 4 as illustrated. Referring also to FIG. 4, if the source is not authorized to access the designated destination device, control passes to block 60 where firewall 30 generates a warning signal indicating an unauthorized access attempt. Here, the warning may be transmitted directly to security/configuration server 14 so that security or other administrative type personnel can determine if any action should be taken in response to the unauthorized access attempt.

In at least some cases, two or more of the secondary security functions described above with respect to FIGS. 5 through 7 may be performed when unauthorized access is attempted. For instance, in at least some cases, it is contemplated that a firewall 30 will generate a log of unauthorized access attempt as well as generate a warning indicating an unauthorized access attempt. Similarly, in other cases, the firewall may transmit a message to a source indicating no right to access a destination device, generate a log and generate a warning. Other secondary security functions are contemplated.

While an embodiment that has been described above wherein a firewall identifies a final destination device specified by a non-IP packet and restricts transmission past the firewall as a function thereof, it should be appreciated that similar systems are contemplated wherein the firewall may be programmed instead to identify all devices corresponding to addresses in the transmission path specified by the no-IP packet and may restrict further transmission when the source is not authorized to access any one or more of the those devices. For example, referring again to FIG. 1, where HMI S1 is not authorized to access device D5 but is authorized access each of devices D4 and D6 through DN, when firewall 30 receives a data packet from HMI S1 that specifies a path through devices D4, D5 and D6 through DN, firewall 30 would identify each of devices D4, D5 and D6 through DN in the packet and would halt transmission past the firewall 30 because HMI S1 is not authorized to access device D5.

In at least some embodiments where HMIs such as HMI S1 are usable by system users to access industrial control devices, it is contemplated that access may be restricted as a function of user identity. For example, a first user U1 using HMI S1 may be restricted to accessing only a first subset of the control devices including devices D1, D2, D5, D6, D7 and so on, while a second user U2 is restricted to accessing only a second subset of the devices including devices D1, D2, D8, D90, D101, D129, etc., despite the fact that each of users U1 and U2 uses the same HMI S1 at different times.

Referring once again to FIG. 3, in addition to listing sources S1, S2, etc., column 52 also lists separate user identifiers U1, U2, U3, etc. For each user identifier in column 52, device access column 54 lists a subset of the control devices and components accessible by the specific user. For example, for the user associated with user identifier U1, accessible devices include devices D1, D2, D5, D6, etc., while accessible devices by the user associated with identifier U2 include devices D1, D2, D8, D90, D101, etc.

In order to restrict device and component access as a function of user identity, user identity has to be determined. In at least some embodiments, it is contemplated that security/configuration server 14 may be programmed to identify a user's identity whenever a user initially attempts to communicate via network 26 and prior to any attempts to access control devices. To this end, server 14 may be programmed to provide a log on agent 22 via HMI S1 which requires a user name and password, uses biometric (e.g., fingers print scan, iris scan, voice recognition, etc.) techniques, etc., to positively identify a user. Here, after server 14 positively identifies a user, server 14 may be programmed to associate the user with the specific HMI used by the user during the user identifying process. For example, where the user uses HMI S1 during the identifying process and to link to IP network 26, server 14 associates HMI S1 with the specific user's identity. The associated source and user data is stored in an HMI/user database that forms part of database 24 (see again FIG. 1).

Figure 8:
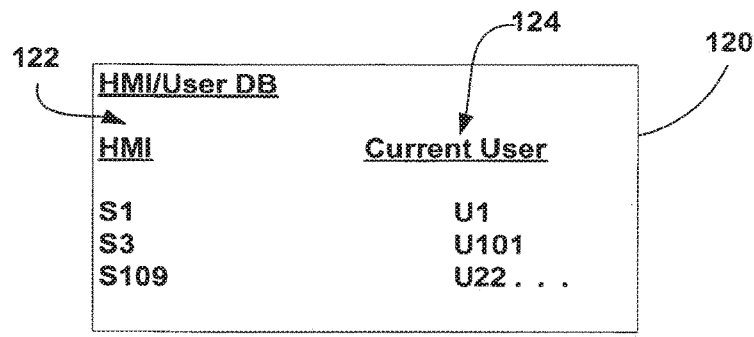
FIG. 8 is a schematic illustrating an exemplary HMI/user database that may be employed by the firewalls of FIG. 1.

An exemplary HMI/user database 120 is illustrated in FIG. 8 and includes an HMI column 122 and a current user column 124. As the label implies, HMI column 122 lists each of the HMI sources currently being used with system 10. Column 124 lists a current user of each of the HMIs in column 122. For example, column 124 indicates that user U1 is currently using HMI S1, that user U101 is currently using HMI S3, and so on.

Referring once again to FIGS. 1 and 2, after a user has been associated with an HMI in the HMI/user database, when one of the firewalls (e.g., 30) receives an information packet 32, the firewall 30 can identify the source of the packet in field 34 and can then access HMI/user database 120 (see again FIG. 8) to identify the current user of the HMI. Thereafter, the firewall 30 can access control database 50 to identify the subset of control devices and components that are accessible by the identified user and can restrict access to the devices when appropriate.

Figure 9:
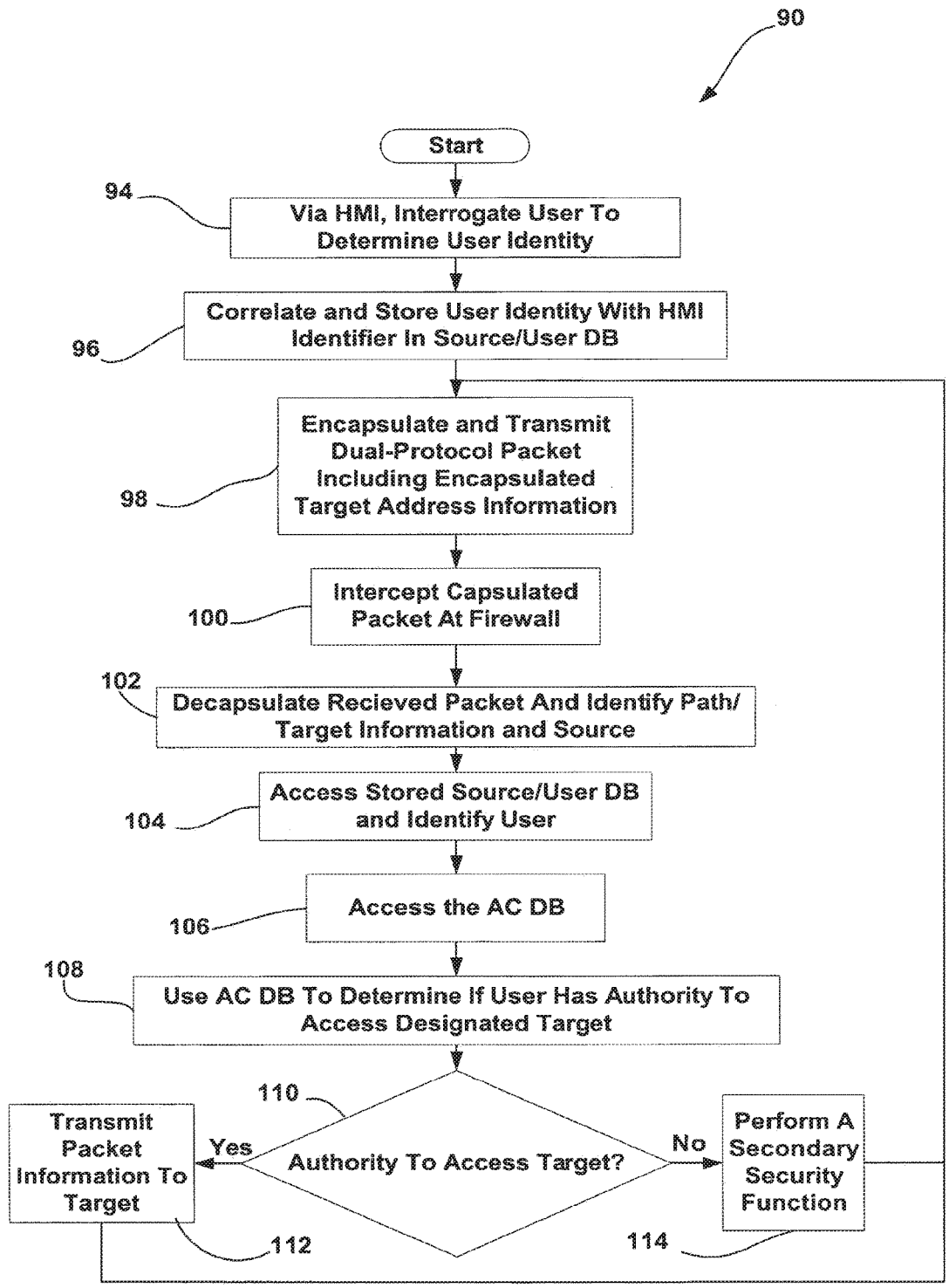
FIG. 9 is a flow chart similar to the flow chart of FIG. 4, albeit illustrating a method wherein device access is restricted as a function of user identity.

Referring now to FIG. 9, an exemplary method 90 for restricting access to control devices as a function of user identity is illustrated. Here again, it is assumed that appropriate firewalls have been provided and that an access control database akin to database 50 in FIG. 3 has been stored in database 24. Referring also to FIGS. 1, 2, 3 and 8, at block 94, server 14 interrogates a user via HMI S1 to identify the user's identity. At block 96, server 14 correlates and stores the user identity with the HMI identifier S1 in the HMI/user database when the user logs onto IP network 26 successfully. At block 98, the user performs some activity causing HMI S1 to attempt to access one of the control devices via encapsulating and transmitting a dual protocol packet at block 98. For the purposes of this explanation, it will be assumed that the users activities caused HMI S1 to attempt to access device DN. At block 100, firewall 30 intercepts the packet and at block 102, firewall 30 decapsulates the received packet to identify the path and destination device information as well as the source of the data packet (i.e., which HMI transmitted the packet). In the present example, the firewall 30 identifies HMI S1 as the source of the packet. At block 104, firewall 30 accesses the stored HMI/user database and identifies the user currently associated with HMI S1. In the present example, fire wall 30 identifies user U1 at block 104.

Continuing, at block 106, firewall 30 accesses access control database 50 (see again FIG. 3). At block 108, firewall 30 uses database 50 to determine if user U1 has authority to access designated target DN. At block 110, where the user U1 does not have authority to access the designated target, control passes to block 114 where a secondary security function is performed. Here, the secondary security function may be any of the functions described above with respect to FIG. 5, 6 or 7, may be a subset of those functions or may be any other suitable security function. After for block 114, control passes back up to block 98 where the process described above is repeated.

Referring again to block 110, where user U1 has authority to access the designated target, control passes to block 112 where the data packet is transmitted to the destination device. After block 112, control passes back up to block 98 where the process described above is repeated.

Although not illustrated, in other cases it is contemplated that the user identifying subprocess (e.g., requiring entry of a user name and password, biometric analysis, etc.) may be performed by each of the decapsulating firewalls 28, 30, 31, etc. Here, for instance, when a data packet 32 (see again FIG. 2) is received by a firewall, such as firewall 30, firewall 30 may be programmed to identify the packet source in field 34 and perform an interrogation of the user currently employing the source prior to decapsulating the other portions of the data packet. In this case, if user identity is successfully verified, the firewall may be programmed to store correlated HMI/user information in a HMI/user database 120 like the one illustrated in FIG. 8 for subsequent use until the HMI (e.g., S1) and user association is discontinued. For instance, when an HMI user logs off an HMI the HMI/user association may be broke. As another example, if a certain period of time (e.g., 30 minutes) without HMI activity occurs, the HMI/user association may be broke.

In addition to restricting device and component access as a function of user identity, in at least some embodiments it is contemplated that access may be restricted in other ways as well. For example, in at least some cases, it may be advantageous to restrict access to specific control devices so that access can only occur during specific times, such as during normal first shift business hours of 9:00 A.M. to 4:00 P.M. or during normal maintenance hours, such as between 10:00 A.M. and 11:00 A.M. In other cases, it may be desirable to restrict access as a function of the location of a source attempting to access a device or component. For example, in at least some cases, while it may be desirable to allow HMI users inside a facility to access control devices, persons outside a manufacturing facility often should not be able to access control devices within the facility. Referring again to FIG. 1, when HMI S1 is used in an attempt to access configuration 21 devices from a location outside a facility associated with configuration 21, access should be restricted while, when HMI S1 is within the facility, a lesser amount of restriction may be appropriate.

As another example, with certain types of devices and components, it may be desirable to restrict access thereto such that, the devices and components can only be accessed when an HMI to be used to access the devices is in a position in which the user of the HMI has the ability to clearly view how the devices are operating. Here, separate zones within a facility may be specified and associated with specific devices such that access to the devices and components via an HMI (e.g., S1) is only allowed when the HMI S1 is located within the associated zone. To identify HMI location any of several different systems can be employed. For example, where HMI S1 has to be physically linked via hardwire to network 26, location can be determined by identifying the location of the linkage. In other cases where HMI S1 is equipped for wireless communication within a facility or outside the facility, access points or the like can be used to generate data usable through a triangulation or other type procedure to identify the location of HMI S1. Methods for using wireless signals to identify HMI location are well known and therefore are not described herein detail.

In addition to separately using user identity, time, location and other non-packet characteristics to restrict device and component access, subsets of those non-packet characteristics can be used to restrict access. For example, user U1 may be restricted such that user U1 can only access device D2 between 10:00 A.M. and 11:00 A.M., but during that time, may be able to access device D2 from any location while user U2 is restricted such that user U2 can access device D2 between 9:00 A.M. and 4:00 P.M. but can only access device D2 during that time period when an HMI used by user U2 is within a first zone (i.e., zone 1) within the facility. Other combinations of non-packet characteristics on which to restrict access are contemplated.

Moreover, in at least some cases access to certain devices could be restricted as a function of non-user and non-source non-packet characteristics such as time, source location, etc. For instance, when a source is located outside a facility associated with configuration 21, irrespective of which source is used to attempt access or, in the case of an HMI, which user is using the HMI, access may be prohibited. Similarly, access may also be prohibited to certain devices during hours outside a normal business day irrespective of source or HMI user identity.

Referring now to FIG. 10, an exemplary relatively more detailed access control database 126 is illustrated which includes, among other columns, a user column 128, a device access column 130, a time column 132 and a location column 134. User column 128 lists the users U1, U2, etc. that are authorized to access system 10 for any purpose. Access column 130 lists a subset of configuration 21 devices for each one of the users in column 128 that are accessible by the user. For example, for user U1, column 130 lists devices D1, D2, D5, D6, etc.

Referring still to FIG. 10, time column 132 specifies a period for each combination of a user and one of the devices or a subset of the devices listed in column 130. For example, for the combination of user U1 and device D1, column 132 lists a time period between 9:00 A.M. and 4:00 P.M. which means that user U1 can access device D1 during the period between 9:00 A.M. and 4:00 P.M. Similarly, for the combination including user U1 and device D2, column 132 lists the time period between times 10:00 A.M. and 11:00 A.M. which indicates that user U1 can access device D2 during the one hour between 10:00 and 11:00 A.M. An "All" designation in column 132 indicates that an associated user in column 128 can access an associated device in column 130 at any time.

Referring yet again to FIG. 10, location column 134 lists location restrictions for each use-device combination in columns 128 and 130. For example, for the combination including user U1 and either of devices D5 or D6, location column 134 indicates that the devices D5 and D6 can only be accessed by user U1 when an HMI used by user U1 is located within a Zone 7 within a facility. An "All" designation in column 134 indicates that access can be had from any location in which an HMI is linkable to IP network 26.

While database 126 is more complicated than the previously described access control database 50 illustrated in FIG. 3, it should be appreciated that operation of firewalls in a manner consistent with database 126 is similar to operation using simple database 50. To this end, referring again to FIGS. 1 and 9, process 90 in FIG. 9 performed by server 14 and the firewalls would be similar to the process described above except that at blocks 106 through 110, a firewall would use the additional non-packet information or characteristics in database 126 to determine whether or not the user has authority to access the designated target device or component. For instance, where firewall 30 identifies user U1 at block 104 and the designated destination device is D5, at block 108, firewall 30 determines that access by user U1 to device D5 can only occur between 9:00 A.M. and 4:00 P.M. and can only occur when the HMI used by user U1 is within Zone 7. Firewall 30 can identify the current time and compare it to the required period and can obtain HMI location information from a device tracking system (not illustrated) and compare that information to the boundaries that define Zone 7. Where the user's HMI is within Zone 7 and the current time is between 9:00 A.M. and 4:00 P.M., user U1 is authorized to access device D5 and control passes to block 112. Where the HMI is not located in Zone 7 or the current time is not within the time period 9:00 A.M. to 4:00 P.M., control passes to block 114 where a secondary security function is performed.

One other way to restrict device and component access is to restrict the access as a function of employee type or training of a particular user type. For example, many facilities may employ maintenance engineers commissioning engineers, industrial engineers, plant managers, line operators, operators of specific line types, etc. While each of these types of employees likely will require access to some control devices to perform their jobs, in most cases, the subsets of devices that need to be accessed by the different employees will be different. Here, it is contemplated that different job titles that reflect user types may be assigned to each system 10 user and that different access rights may be provided as a function of the user type. For instance, a maintenance engineer may be authorized to access a first subset of control devices while a line operator may be authorized to access a second subset of control devices. In this case, when a firewall 30 receives a packet and uses packet information to identify the user of the HMI (e.g., laptop S1) used to transmit the packet, the firewall may further be programmed to identify the job title associated with the user and thereafter to identify the subset of devices and components accessible by the specific user.

Figure 11:
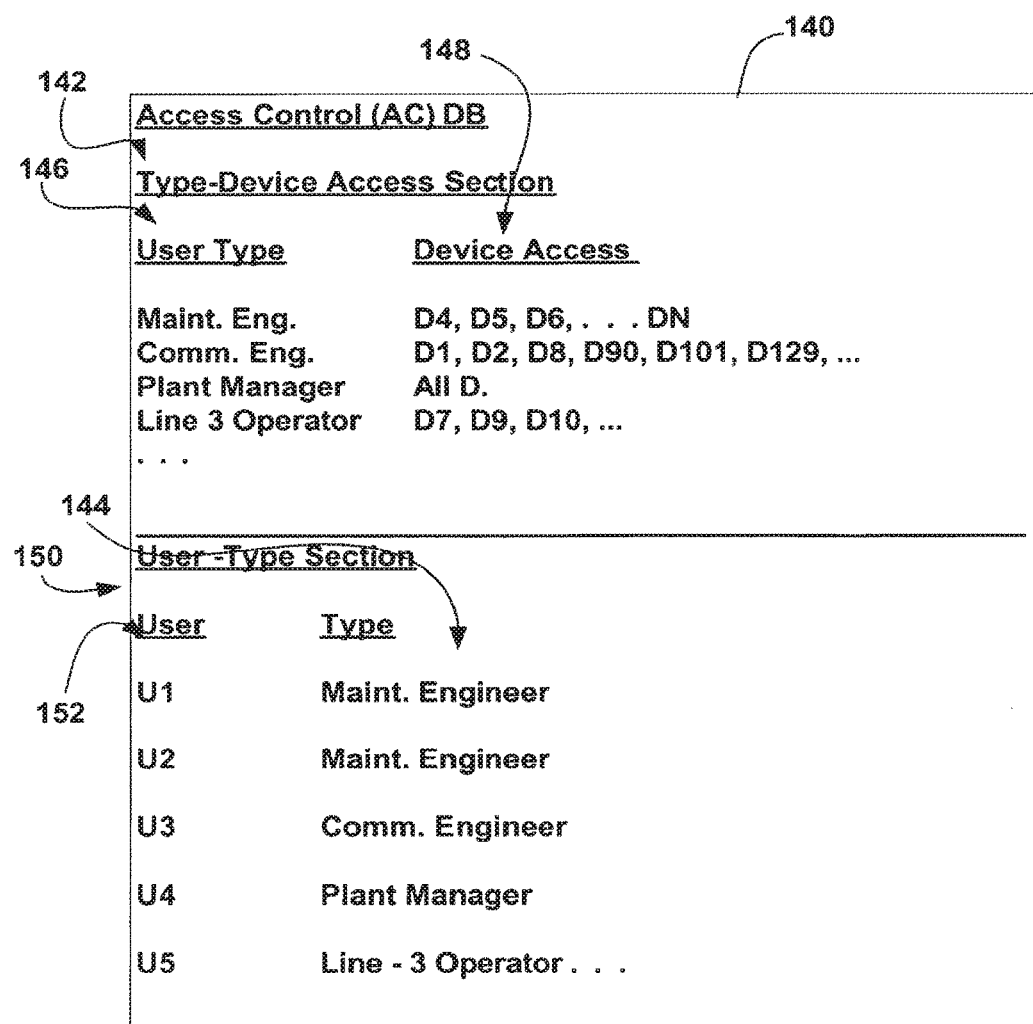
FIG. 11 is yet another exemplary access control database including restrictions as a function of user type and a specification that identifies types corresponding to specific users.

Referring now to FIG. 11, an exemplary access control database 140 usable to control device and component access as a function of user type is illustrated. Database 140 includes a type-device access section 142 and a user type section 150. Section 142 includes a user type column 146 and an access column 148. User type column 146 lists user types for each of the different types of employees that may require access to any control devices with configuration 21. For example, in FIG. 11, user types include a maintenance engineer, a commissioning engineer, a plant manager, a line 3 operator, etc. Access column 148 lists a subset of devices accessible by each one of the user types in column 146. For example, devices D4, D5, D6, etc. are listed for the maintenance engineer designation in column 146 while devices D1, D2, D8, D90, etc. are listed for the commissioning engineer designation in column 146.

Referring still to FIG. 11, user type section 150 includes a user column 152 and a type column 144. Each of the system 10 users authorized to access at least one control device is listed in column 152. For example, users U1 and U2 as well as other users are listed in column 152. Type column 144 lists a user type for each one of the users in column 152. For example, the user type "maintenance engineer" has been assigned to each of users U1 and U2 in column 152 while type "commissioning engineer" has been assigned to user U3 in column 152.

Referring still to FIG. 11 and also to FIGS. 1 and 9, to restrict access as a function job titles or user types, after a firewall has identified the identity of a user that caused an HMI to transmit a packet intercepted thereby at block 104, at block 108, the firewall uses database 140 to determine whether or not the user has authority to access the designated destination device. To this end, the firewall first uses user characteristics section 150 of database 140 to determine the type of user (e.g., maintenance engineer, commissioning engineer, plant manager, etc.). Assuming that user U1 caused the packet to be transmitted, the firewall uses section 150 to determine that user U1 is a maintenance engineer.

Next, after identifying the user type, the firewall uses database section 142 to identify devices that the user is authorized to access and restricts as a function of the device list in column 148.

In most cases essential control method and processes in an industrial environment will be supported entirely by control components and devices linked via the non-IP network and within configuration 21. Here, to ensure that essential methods and processes are always performed as quickly as possible, and in at least some cases, it is contemplated that, when the firewalls intercept data packets, the firewalls will be programmed to prioritize packets transmitted thereby onto the non-IP network. In this regard, referring to FIG. 10, access control database 126 includes a priority column 136 where priority column 136 lists different priorities for each one of the user and device combinations in columns 128 and 130. For instance, a priority P3 is listed in column 136 for the combination including user U1 and device D1 while a priority P1 is provided in column 136 for the combination including user U1 and device D5 in columns 128 and 130, respectively, where priority P1 is a higher priority than priority P3. In this case, it is contemplated that non-IP network communications all have assigned priority values so that when a firewall (e.g., see 30 in FIG. 1) transmits a packet, the priority assigned to the packet by the firewall can be compared to the priorities of non-IP network packets and can be routed accordingly.

Figure 12:
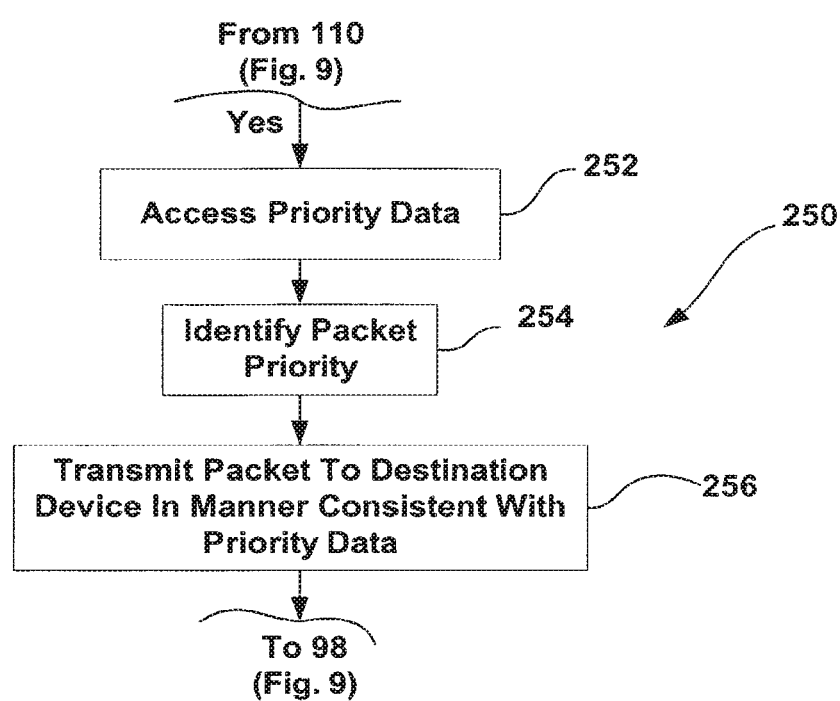
FIG. 12 is a flow chart illustrating a sub-method that may be substituted for a portion of the method of FIG. 9 to facilitate prioritization of data packets when they are passed by the firewalls of FIG. 1.

Referring now to FIG. 12, an exemplary sub-process 250 that may be substituted for block 112 in FIG. 9 is illustrated. Referring also to FIGS. 1 and 9, after a firewall determines that a user has authority to access a designated destination device, control passes from block 110 to block 252 where firewall 20 accesses the priority data in database 126 (see again FIG. 10). The firewall uses the priority data in column 136 to identify the priority of a packet having the non-packet characteristics associated therewith listed in columns 128, 130, 132 and 134. After priority has been identified, at block 256, the firewall transmits the packet to the destination device or component in a manner consistent with the priority data.

In many cases, while it may be desirable to allow a specific user to access specific devices and components for specific purposes, it may not be desired to allow the user to access the devices and components for other purposes (e.g., to facilitate other applications). For example, while it may be desirable to allow a plant manager to monitor virtually any device activity within a facility, it may be undesirable to allow a plant manager to alter or control device operations. Thus, according to another aspect of at least some embodiments of the present invention, device access may be limited or restricted on an application by application basis. In this regarding, referring once again to FIG. 10, an applications column 135 is provided within database 126 where applications columns 135 lists separate applications for each one of the user and device combinations in columns 128 and 130, respectively. For instance, for the combination including user U1 and device D1 in columns 128 and 130, column 135 lists applications A1, A3 and A4 meaning that only applications A1, A3 and A4 can be affected by user U1 on device D1. In other words, applications A2 and applications A5, A6 and so on can not be performed by user U1 on device D1.

In many cases, when a user causes an HMI to access a device by sending data packets, it is impossible to determine the application to be performed via the device from a single packet. Thus, in at least some embodiments, it is contemplated that the firewalls will be programmed to accumulate information packets intercepted thereby until intended applications associated with the accumulated packets can be identified from the packet information. For instance, in one simple case, a firewall may have to accumulate 100 information packets in order to identify a specific type of application to be affected by the accumulated packets. Here, the firewall would store the packet information until sufficient information is available to identify the intended application. Once the intended application is identified, the firewall accesses database 126 and determines whether or not the intended application is authorized (e.g., whether or not the application appears in the listing in column 135 corresponding to the user and device combination in columns 128 and 130, respectively).

Figure 13:
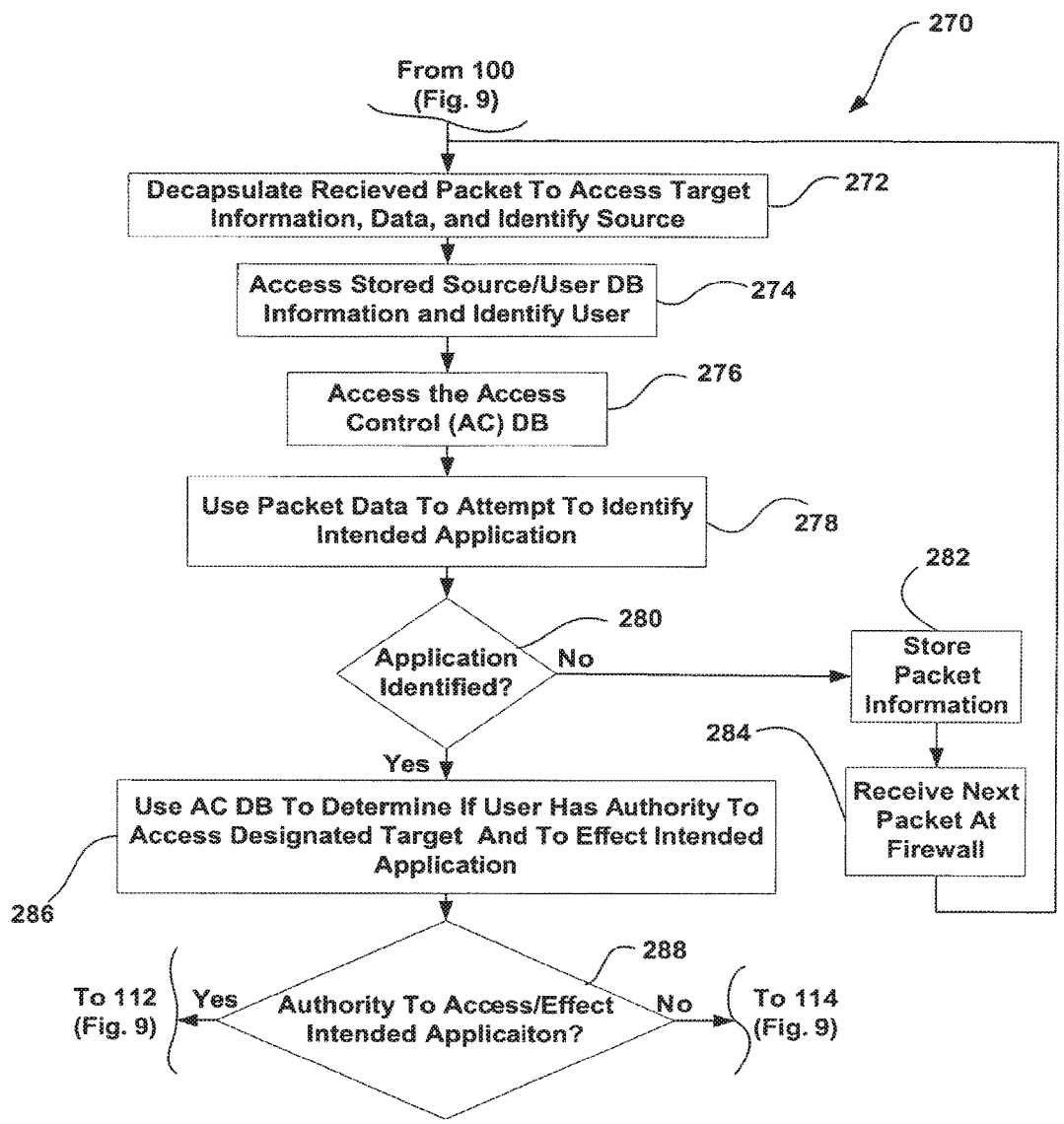
FIG. 13 is a flow chart of a sub-process that may be substituted for a portion of the process of FIG. 9 wherein the firewalls of FIG. 1 analyze multiple data packets when necessary to identify intended application and restrict as a function of applications to be performed.

Referring now to FIG. 13, a sub-method 270 that may be substituted for blocks 102, 104, 106, 108 and 110 in FIG. 9 is illustrated. Referring also to FIGS. 1 and 9, after a firewall intercepts an data packet at block 100, control passes to block 272 in FIG. 13. At block 272, the firewall decapsulates the received data packet to access target information, packet data and the packet source (e.g., to identify the HMI that transmitted the packet). At block 274, the firewall accesses the stored HMI/user database and identifies the HMI user. At block 276, the firewall accesses the access control database 126 (see again FIG. 10). At block 278, the firewall uses the packet data to attempt to identify the intended application to be performed on the target device. At block 280, where the data from the packet and data from other preceding packets is insufficient to identify the application, control passes to block 282 where the packet information is stored. At block 284, the firewall receives next data packet and control passes back up to block 272 where the decapsulating and analysis process is repeated as described above.

Referring again to block 280, if the intended application has been identified, control passes from block 280 to block 286. At block 286, the firewall uses the access control database 126 to determine if the user has authority to access the designated destination device and to affect the intended application. At block 288 where the user has authority to access and to affect the intended application, control passes to block 112 in FIG. 9 where all of the stored packet information is transmitted to the destination device. However, at block 288, where the user does not have the authority to access the device or does not have the authority to affect the intended application, control passes back to block 114 in FIG. 9 where a secondary function is performed.

According to one additional aspect of the present invention, in at least some embodiments, it is contemplated that security server 14 (see again FIG. 1) may be useable in a learn mode or during a learning process to monitor use of an HMI by a particular user type to identify expected control device access for that user type so that the security server 14 can establish access control rules for populating an access control database. In this regard, in at least some cases it is contemplated that prior to a learning procedure for a specific user type, no restrictions have been specified in an access control database for restricting user access to the industrial control devices in configuration 21. Here, during the learning process an HMI user of the type associated with the specific process performs various tasks required to perform his job. During task performance the user's HMI forms and transmits data packets on IP network 26 that designate destination devices within configuration 21. Whenever one of the firewalls 28, 30, 31, etc., receives a data packet from the HMI, the firewall passes the packet on to the destination device without restriction.

Security server 14 is programmed to monitor communications between the HMI and the configuration 21 devices and store records of device access. In this regard, the firewalls 28, 30, 31, etc., may cooperate to transmit copies of information packets from HMIs currently being tracked by server 14 to server 14 so that server 14 can store records of device access. In addition to storing records identifying that access has occurred, the server 14 may also identify and store other non-packet characteristics such as the times at which the access occurs, the locations of the HMI when access occurs, the frequency of access, etc. Moreover, server 14 may also be programmed to identify the nature of the access performed by an HMI during a learning process. For example, server 14 may be programmed to determine whether or not the access was associated with a monitoring activity, a value setting or control activity, a data exchange or some other type of activity. After a learning process has been completed, server 14 can use the stored access information to populate a portion of an access control database like database 50 in FIG. 3 in a simple case or, to populate a more complex control database like database 126 in FIG. 10 or database 140 in FIG. 11.

Figure 14:
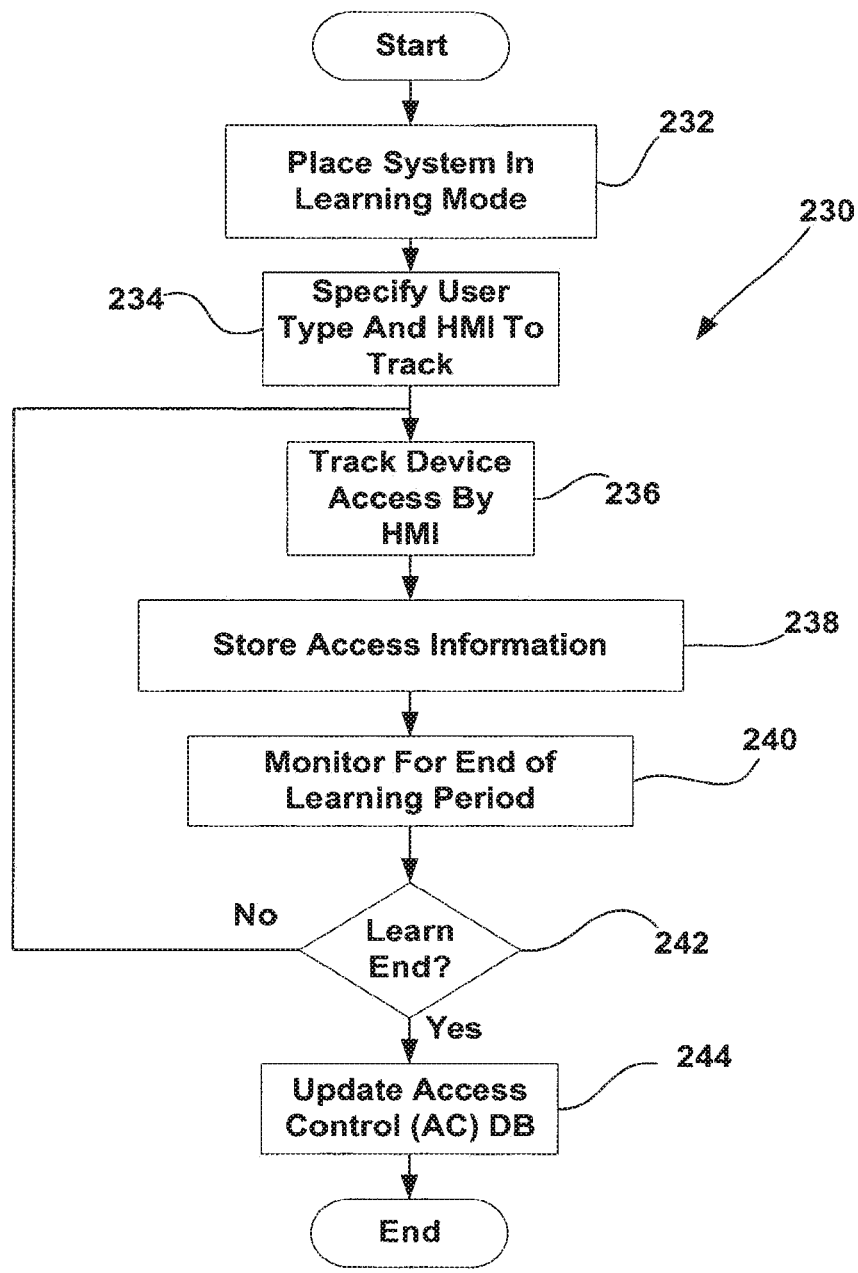
FIG. 14 is a flow chart illustrating yet another method according to at least some aspects of the present invention wherein a security server of FIG. 1 learns access requirements and populates a portion of an access control database corresponding to a specific HMI user type.

Referring now to FIG. 14, an exemplary learning process 230 is illustrated. At block 232, a system administrator uses HMI 16 to place security server 14 in a learning mode so that server 14 can identify access typically required of a specific user type. Next, at block 234, the administrator uses HMI 16 to specify a specific user type and to specify an HMI to be tracked. For example, at block 234, the administrator may indicate that the current learning procedure will be used identify access activity required by a maintenance engineer and may specify HMI S1 as the HMI to be tracked during the learning process. Hereinafter it will be assumed that the learning process is for a maintenance engineer type user and that HMI S1 is to be tracked during the learning process.

Continuing, referring to FIG. 14, at block 236, while a maintenance engineer uses HMI S1 to perform routine maintenance activities on the configuration 21 control devices, server 14 tracks device access by HMI S1. At block 238, server 14 stores HMI S1 access information. At block 240, server 14 monitors for some indication that the learning process should be ended (e.g., a learn process complete signal from HMI 16). At block 242, while the learning process continues, control loops back up to block 236 where the process including blocks 236, 238 and 240 is repeated. At block 242, when a system administrator uses HMI 16 to indicate that the learning process has been completed, control passes to block 244 where server 14 updates the access control database. In the present example, the changes to the access control database may result in supplementing a type/device access section 142 of an access control database as illustrated in FIG. 11 where device access indicates devices accessed via HMI S1 during the learning process.

While the learning process has been described above in the context of a method for identifying access required by a specific user type, it should be appreciated that a similar process could be performed for a system user type, the administrator identifies a specific user at the beginning of the learning process.

According to one other aspect of at least some embodiments of the present invention, it is contemplated that HMI 16 may also be used by a system administrator to manually specify access control information. In this regard, server 14 may be provided with a full specification related to the industrial control devices that form configuration 21 so that information related to configuration 21 can be provided via HMI 16 allowing the administrator to manually select devices or subsets of the devices to be accessible by specific system users, specific sources (e.g., specific laptops, specific servers and databases, etc.), and, where contemplated, to specify other non-packet characteristics to affect access restriction. Here, the configuration 21 information presented via HMI 16 may take any of several different forms including, but not limited to, a hierarchical list of control devices, a graphic view of the control devices such as a tree, an iconic graphical view, etc.

Figure 15:
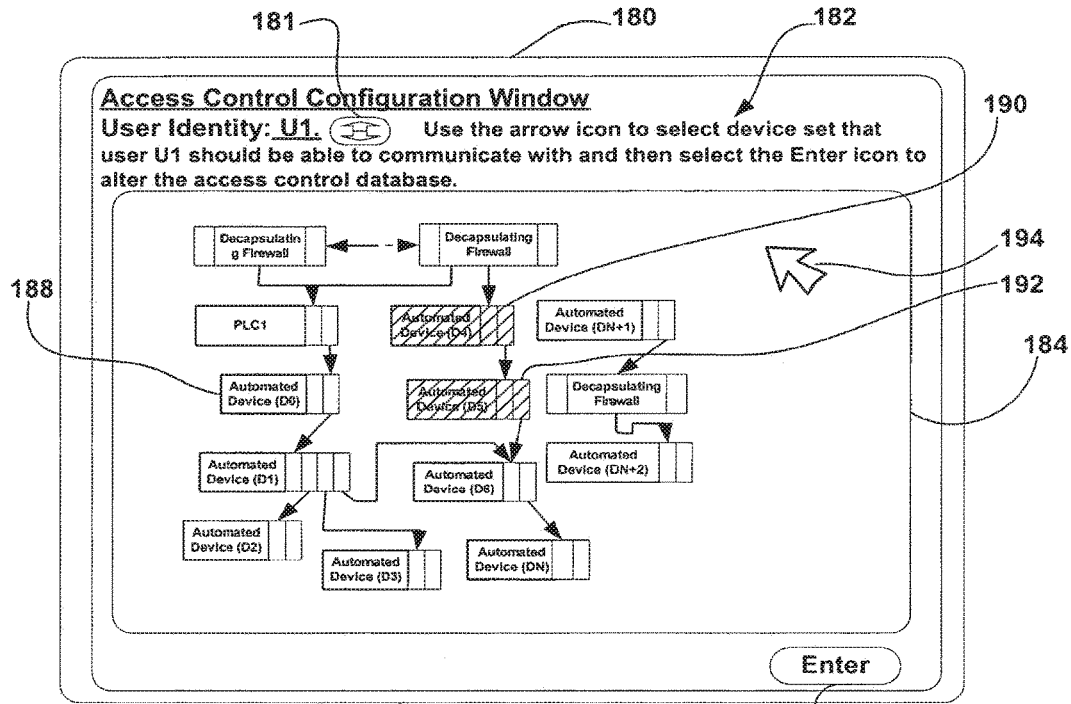
FIG. 15 is a screen shot or window that may be provided via an administrator's interface of FIG. 1 for manually specifying access control for a particular system user.

Referring now to FIGS. 1 and 15, an exemplary administrator's HMI screenshot 180 that may be presented via HMI 16 during manual access control specification is illustrated. Window 180 includes instructions 182 to guide an administrator to provide information required to provide access control information. In addition, window 180 includes a sub-window 184 in which a configuration graphic consistent with configuration 21 in FIG. 1 is presented where each control device within configuration 21 is separately presented and linking relationships therebetween are also shown. Moreover, a mouse controllable selection icon 194 is provided that can be moved within sub-window 184 to point to different control devices therein. When icon 194 is pointing at one of the device icons within sub-window 184, a selection activity (e.g., a double click on a controlling mouse) causes the device icon to be highlighted. In FIG. 15, each of devices D4 and D5 are shown as being highlighted via cross-hatches therethrough.

Referring still to FIG. 15, a double arrow icon 181 is provided adjacent a user indicator field 195 which, in FIG. 15, indicates user U1. Here it is contemplated that icon 181 may be used to scroll through different known system users for which access control information has already been placed in the access control database so that the administrator can easily switch from one user to the next during a specifying procedure. Where access control information has already been stored for one of the users, when the administrator scrolls to that user's identity via icon 181, in at least some cases, it is contemplated that a graphic of configuration 21 for the specific user would automatically be provided within sub-window 184 and would indicate, via highlighting, devices controllable by a particular user. For new users, the administrator can simply provide an identifier (e.g., U1) in field 195 corresponding to the new user. Referring again to FIG. 15, window 180 also includes an enter icon 186. After device icons to be accessible by a specific user have been selected via sub-window 184, when enter icon 186 is selected, in at least some cases, a simple access control database like database 50 in FIG. 3 is supplemented for the specific user.

Figure 16:
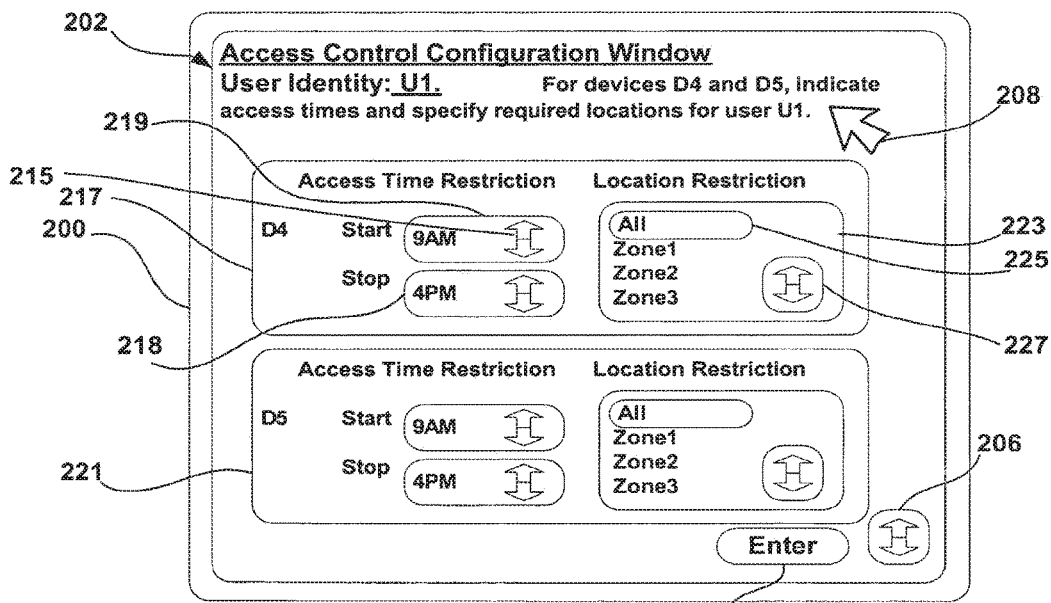
FIG. 16 similar to FIG. 15, albeit illustrating a different access control configuring window.

In other cases, where additional non-packet characteristics are to be used to restrict device access, when enter icon 186 is selected in FIG. 15, other specifying tools may be provided via interface 16. For example, in at least some cases, when icon 186 is selected in FIG. 15, another HMI window like window 200 in FIG. 16 may be provided. In FIG. 16, additional instructions 202 are provided for a system administrator to guide the administrator in specifying other important non-packet characteristics for restricting access. In the present example, the instructions indicate that for the devices D4 and D5 that were selected via sub-window 184 in FIG. 15, the administrator should indicate access times and specify required locations for the specific user to access. In addition, for each of devices D4 and D5, a separate non-packet characteristics specifying window 217 and 221, respectively, is provided. Each of windows 217 and 221 is similar and therefore, in the interest of simplifying this explanation, only aspects of window 217 corresponding to device D4 will be described here. Within window 217, start and stop time fields 219 and 218, respectively, are provided that can be used by the administrator to specify start and stop times at the beginning and end of a period during which the particular user should be able to access device D4, respectively. In addition, two headed arrow icons are provided in each of the time fields 219 and 218, only one of the two headed arrow icons 215 labeled. The two headed arrow icons may be selected via mouse controlled cursor 208 to change the corresponding start or stop time.

Referring still to FIG. 16, window 217 also includes a location restriction sub-window 223 that can be used to specify locations in which the particular user should be able to access device D4. Within sub-window 223, a list of possible location restricting spaces is provided including an "All" designation, a Zone 1 designation, a Zone 2 designation, etc. Cursor 208 can be used to select one of the location restriction designations. A selection box 225 is provided around the selected location restriction designation. For example, in FIG. 16, box 225 is provided around the All designation indicating that, as currently set, the user should be able to access device D4 from all locations. A double headed arrow icon 227 is provided within window 223 to allow the administrator to scroll through location restriction designations where more than the four illustrated designations are possible.

Referring still to FIG. 16, window 200 also includes an enter icon 204 and a double headed arrow icon 206 near a lower edge thereof. Double headed arrow icon 206 can be used to scroll through different device windows like windows 217 and 221 when more than two devices are selected via sub-window 184 in FIG. 15. After time and location restriction information has been specified via windows 217 and 221, when enter icon 204 is selected, server 14 compiles the information specified via windows 180 and 200 and supplements an access control database similar to the database illustrated in FIG. 10.

Figure 17:
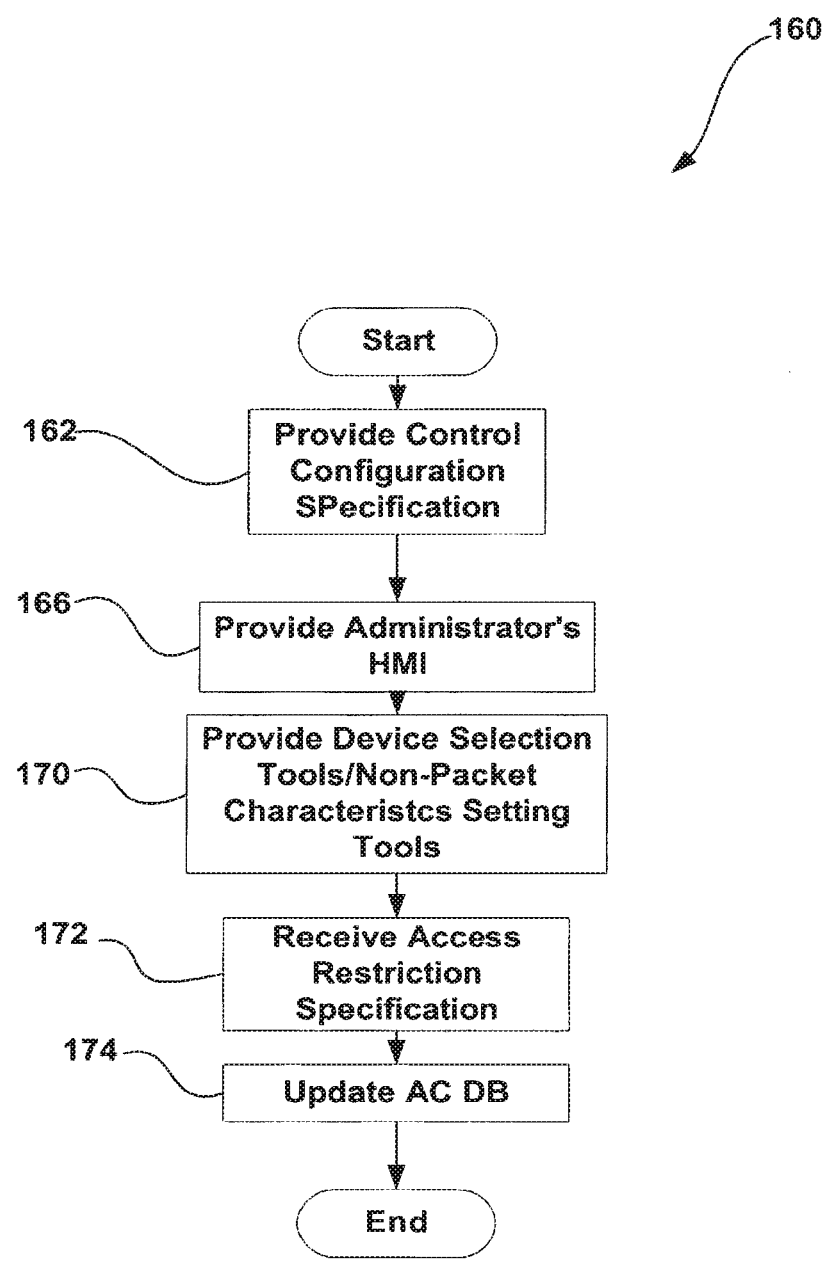
FIG. 17 a flow chart illustrating a method whereby a systems administrator manually specifies access control information.

Referring now to FIG. 17, a method or process 160 for manually configuring an access control database using an administrator's HMI is illustrated. At block 162 a control configuration specification (e.g., a graphical specification or a directory view type specification) is provided. At block 166, an administrator's interface 16 is provided. At block 170, device selection tools and non-packet characteristics setting tools where necessary, like tools illustrated in FIG. 15 or 16 or tools akin thereto, are provided via HMI 16. At block 172, after the administrator uses the HMI tools to specify access control information, the access restriction information is provided to server 14 which, at block 174, updates the access control database.

While two different methods for specifying access control database information are described above, one in which the security server performs a learning process and another in which a system administrator manually specifies access control information, in at least some cases it is contemplated that a hybrid system may be provided wherein, during a learning process, the server 14 performs a process similar to the process described above. Thereafter, an administrator may use interface tools like those described above with respect to FIGS. 15 and 16 to analyze the access control information that resulted from the learning process and to modify that access information. To this end, for example, referring again to FIG. 15, after a learning process for user U1, the administrator may access a screen shot like the one illustrated in FIG. 15 for user U1 where all accessed devices are shown as highlighted. Here, the administrator may either move on to a screen like that shown in FIG. 16 to see the non-packet characteristics that resulted from the learning process or may manually select other devices via sub-window 184 to be accessible or deselect highlighted devices in sub-window 184 that should not be accessible.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

For example, while access control information is described above as indicating devices that can be accessed and non-packet characteristics that correspond to access rights, in other embodiment the access control information may instead identify devices that cannot be accessed or non-packet characteristics that correspond to inaccessible conditions. For instances, referring again to FIG. 3, for user U1, the device access list in column 54 may list devices D3, D8, D9, etc., that are not accessible by user U1 and in that case the firewalls would only allow access to devices that are not listed in column 54. In addition, referring again to FIG. 1, while the comparing steps have been described above as being performed by firewalls 28, 30 and 31, in at least some cases, it should be appreciated that the comparison steps may be performed by server 14. Moreover, while firewalls 28, 30 and 31 are illustrated as being separate devices or components within the overall system 10, it should be appreciated that each one of the firewalls may take any of several different forms. For example, firewall 28 may be embedded within PLC1, may be its own standalone device or may run on a remote server.

In addition, referring again to FIG. 1, while firewalls 28 and 30 are shown as being located between sources 27 and the devices within network 21, firewalls may be linked to the other components described in any of several ways and the devices and sources may be programmed to communicate accordingly. For instance, in at least some applications firewalls 28 and 30 may be programmed to physically intercept any communications transmitted to destination devices within network 21 even if those communications do not specify one of the firewalls as a path device. Thus, for example, where source S1 is used to transmit a packet identifying the address of PLC1 as the IP destination (see field 36 in FIG. 2), fire wall 28 may be programmed to monitor network 26 for all communications specifying PLC1 as an IP address and to then intercept those communications to be scrutinized as described above.

As another instance, firewalls (e.g., 28, 30) may be employed and referenced as network devices that separate network 21 from sources 27. Here, firewalls 28 and 30 may be placed within the overall network so that the firewalls physically separate network 21 from sources 27. In this case, when a source is used to access/control one of the devices within network 21, the source may be programmed to route a data packet to one of the firewalls as if the firewall was one of the devices within network 21. In other words, referring to FIGS. 1 and 2, a packet may specify the address of firewall 28 in IP destination address field 36 and the Non-IP path address fields 38, 40, etc., may then specify the network devices PLC1, D0, D1, etc. In this case the data packets are not intercepted by the firewalls but are directed specifically to the firewalls as part of the network 21.

Exemplary System

Now an exemplary system will be described wherein a second or embedded protocol that is embedded in an IP packet is the CIP protocol.

In addition to specifying a routing or communication path for packets, the CIP protocol also enables specification of specific activities that should be performed by a target network device. To this end, the CIP protocol enables specification of a specific "object" associated with a target network device that is associated with a packet as well as a service to be performed at, by or related to the object. With respect to the "object" concept, this concept contemplates a hierarchical organization of device functions and features including, in at least some cases, a class level, an instance level and an attributes level. For instance, an exemplary class may include a general class of devices such as proximity sensors. An instance of a proximity sensor, as the label implies, is a single occurrence of a proximity sensor. For example, in at least some cases a single network device may include three instances of the proximity sensor class (i.e., the device includes three separate proximity sensors). Instance attributes are functional or operational characteristics associated with either a class or an instance of a class. For example, a proximity sensor may be able to be operated in either one of two different ways. First, a proximity sensor may be able to precisely sense proximity of a part at a station along a transfer line and generate a variable signal to indicate a precise distance between the sensor and the part. Second, the proximity sensor may be able to operate in a binary fashion to indicate either presence or absence of a part at a transfer line station. Here, the mode of sensor operation (i.e., binary or precise) may be an attribute of the proximity sensor class that can be altered. As another example, where an instance of a proximity sensor is operated in the binary mode, an attribute of the instance may be the value (i.e., 1 or 0) of the sensor at a specific time.

In the above examples, a service to be performed on the proximity sensor class may be to change the mode of operation from binary to precise using a write command. A service that may be performed on an instance of a proximity sensor that is operating in the binary mode may be to read the sensor value. Here, it should be appreciated that the examples described above are only exemplary and have been limited in the interest of simplifying this explanation. In a working system, as one of ordinary skill in the art would understand, a huge number of different object classes, instances and attributes are contemplated and would be supported by a functioning system.

Referring again to FIG. 1, in the case of the CIP protocol, to determine if a packet from a source should be transmitted to a target or destination device, a firewall 30 may be programmed to examine an intended routing path through the network 21 devices, the target device, the target object (i.e., class-attribute, class-instance-attribute, etc.) at a target device and perhaps the service to be performed at, by or to the target object. The process wherein a firewall examines target objects and services is referred to hereinafter as "object filtering".

Figure 28:
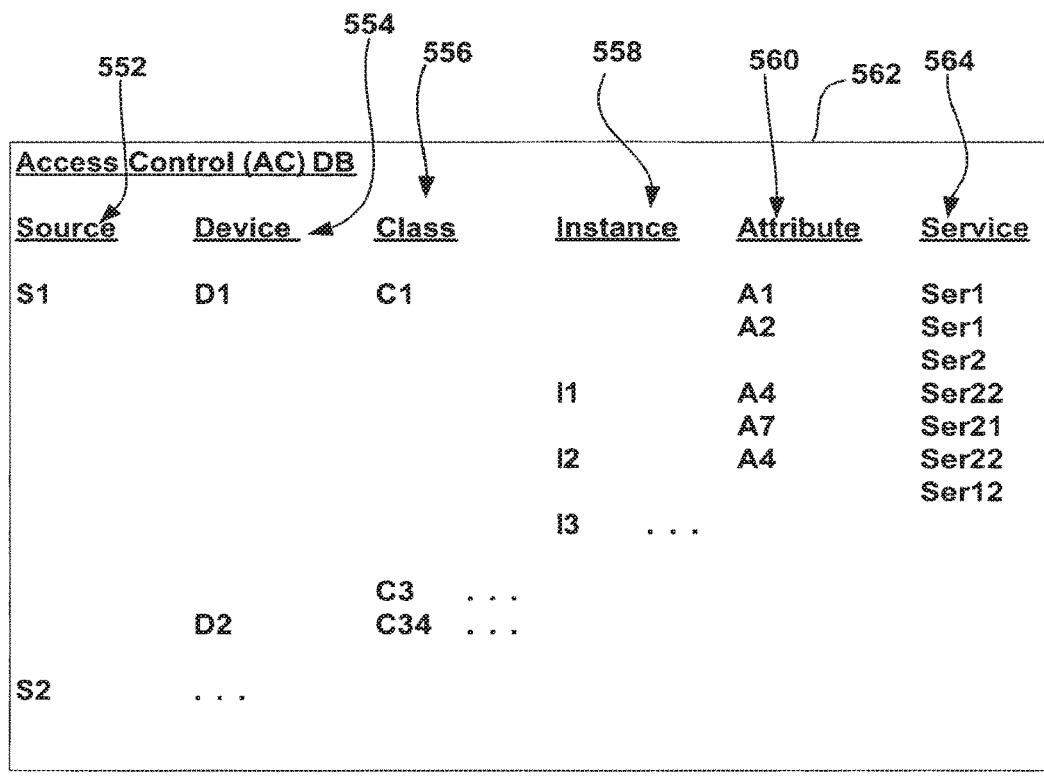
FIG. 28 is an exemplary access control database that is similar to the database of FIG. 3, albeit including additional information.

To support object filtering, first, objects accessible to specific sources have to be identified and services that can be initiated at, by or on specific objects. To this end, an enhanced access database may be provided. Referring now to FIG. 28, an exemplary access control database 562 that may be maintained within database 24 for supporting object filtering is illustrated. Exemplary database 562 includes a source column 552, a device column 554, a class column 556, an instance column 558, an attribute column 560 and a service column 564. Source column 552 lists each of the sources that may, for any purpose, access devices within non-IP network 21. To this end exemplary sources in column 552 include sources S1, S2. Device column 554 includes a separate list of non-IP network devices corresponding to each of the sources in column 552. For example, column 554 includes devices D1 and D2 corresponding to source S1 in column 552. The devices associated with a source in column 552 include any non-IP network devices that the corresponding source can access for any reason.

Referring still to FIG. 28, class, instance and attribute columns 556, 558 and 560, respectively, together are used to specify different device objects corresponding to each of the devices in column 554. For instance, the combination including class C1 and attribute A1 specifies a specific attribute of a specific class associated with device D1. Similarly, the combination including class C1, instance 11 and attribute A4 specifies a different object associated with device D1. Other class, instance and attribute combinations are contemplated and a small subset thereof are illustrated in columns 556, 558 and 560. As shown, more than one attribute may be associated with a class or instance and more than one instance may be associated with a single class.

Service column 564 specifies one or more services or functions that are associated with each of the attributes in column 560. In the example, a first service Ser1 is associated with attribute A1 in column 560. Similarly, two services Ser1 and Ser2 are associated with attribute A2 in column 560. A service Ser22 corresponds to an object including class C1, instance 11 and attribute A4 related to device D1 and source S1 in columns 554 and 552, respectively, which means that source S1 is authorized to initiate service Ser22 for device D1 and the related object corresponding to the combination of class C1, instance 11 and attribute A4.

In the case of the CIP protocol there are two general ways in which to send data packets between sources and target network devices. First, when only minimal amounts of information/data need to be transmitted to a network device or from a network device to a source and there is no need for a reply from the receiving component or when only minimal back and forth communication is necessary, data packets can be sent between a source and a network device along route paths without forming a persistent connection path therebetween. A communication of this type is referred to hereinafter as an "unconnected send" because, as the label implies, a packet is sent in one direction and a persistent connection path is not set up between the source and device. Herein, the phrase "persistent connection path" is used to refer to a path that, once established, does not have to be re-indicated each time a data packet is transmitted along the path and that can be affirmatively eliminated.

Second, when larger quantities of information need to be sent between a source and a network device or when several rounds of back and forth communication between a source and a network device are required, a persistent communication path can be established between the source and the network device so that overhead required to perform communications can be reduced appreciably (i.e., the path does not have to be re-indicated with each transmitted packet). To establish a persistent source to network device connection path, several communications are required in at least some embodiments including an initial source communication indicating that a persistent connection path should be formed and specifying a communication path through the non-IP network to a destination or target device. In addition, an initial network device communication back to the source is required in some embodiments.

In at least some applications the initial source communication also includes a target-to-originator (T-O) connection ID (T-O ID) that is to be used by the target device when the target sends packets back to the source (i.e., the originator). Here, the source will only accept packets back from the target network device that include the T-O ID. Similarly, in at least some applications, the initial network device communication also includes an originator-to-target (O-T) connection ID (O-T ID) that is to be used by the source (i.e., the originator) when the source sends second and subsequent packets to the target network device. Here, the target device only accepts packets from the source that include the O-T ID. Establishment of a connection path will be described in greater detail below.

Hereinafter, unless indicated otherwise, the initial source packet for establishing a persistent connection path with a network device will be referred to as an "unconnected forward open request" because the packet commences the opening of a connection path and is initially unconnected (i.e., the path initially is not connected). Similarly, the initial network packet will be referred to hereinafter as an "unconnected forward open reply" because the packet is a reply to the open request. Packets transmitted after a connection path is established will be referred to hereinafter as "connected send" packets or communications. A packet to eliminate a persistent connection path will be referred to hereinafter as an "unconnected forward close request".

Figure 18:
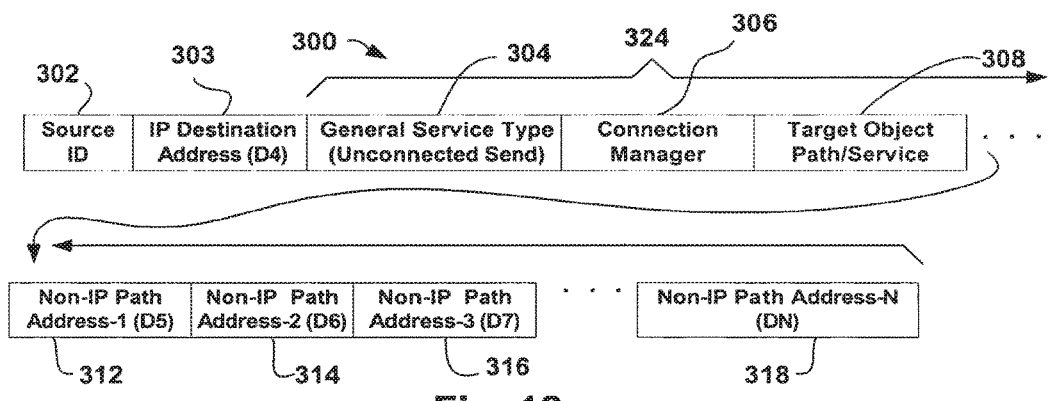
FIG. 18 is a schematic view of an exemplary dual protocol data packet including a CIP data packet embedded or encapsulated within an IP type data packet where the data packet corresponds an unconnected send type service.

Referring to FIG. 18, an exemplary dual protocol data packet 300 including a CIP data packet embedded or encapsulated within an IP data packet is illustrated. Exemplary packet 300 corresponds to a typical unconnected send packet. Here, packet 300 is shown in its simplified form and it should be appreciated that a typical packet may include other fields populated with various types of information useful or required for transmitting the packet 300 from a source to a target network device.

Exemplary packet 300 is a typical IP packet and, to that end, includes a frame that specifies packet source and destination device as well as a data field within the frame. Packet 300 includes a source ID field 302 and an IP destination address field 303. The IP packet data field is identified by numeral 324 and includes fields 304, 306, etc. IP data field 324 is where data for delivery to an IP destination address is typically located. In the present case, a non-IP data packet is encapsulated in field 324 where the packet includes non-IP path device address fields 312, 314, 316 and 318 as well as a general service type field 304, a connection manager field 306 and a target object path/service field 308. As in the case of FIG. 2 above, the non-IP address fields 312, 314, 316 and 318 specify a string of addresses corresponding to non-IP devices and specify a path for non-IP routing to the target network device.

Referring still to FIG. 18, general service type field 304, as the label implies, specifies a general type of service associated with packet 300. For example, exemplary general service types include an unconnected send, a connected send, an unconnected forward open request, an unconnected forward open reply, an unconnected forward close request, etc. Here, although a small number of general service types are described, it should be understood that many other service types are contemplated. In FIG. 18, as indicated in brackets, the service type associated with packet 300 is an unconnected send meaning that the packet 300 is to be transmitted to a target network device without establishing or opening a persistent connection path.

Connection manager field 306 is used to indicate that the packet 300 should be internally routed within the IP destination device to a connection manager object within the device. Here, in at least some embodiments, each of the non-IP network 21 devices includes a connection manager object which is typically a software program that is provided to manage communication paths for the device. In the case of an IP destination device, the connection manager object is capable of identifying a general service type specified in field 304 and examining the address fields (e.g., 312, 314, etc.) to identify the next device within the non-IP routing path to which at least a subset of the packet 300 information should be transmitted.

Figure 19:
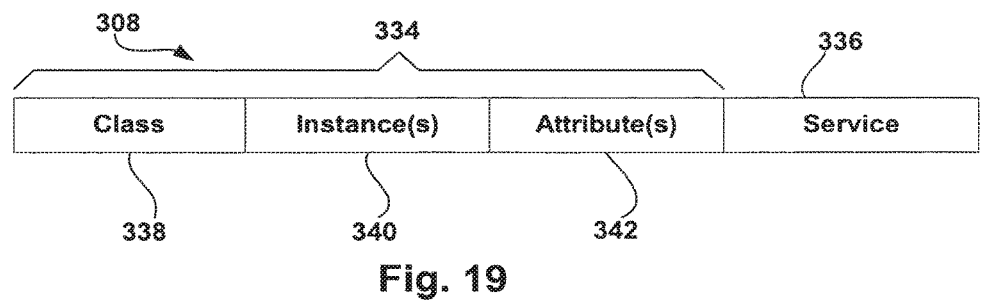
FIG. 19 is a schematic view of an exemplary object path/service field as illustrated in FIG. 18 including a plurality of subfields.

Referring still to FIG. 18, object path/service field 308, as the label implies, specifies a specific object associated with the target device and a service to be performed at, by or on the object. For instance, consistent with the above example, the object path and service field 308 may specify a specific proximity sensor instance associated with a target device and that the value of the sensor should be read (i.e., the service is to read a value). In this regard, referring also to FIG. 19, an exemplary object path/service field 308 is illustrated that includes an object field 334 and a service field 336. Object field 334 includes a class subfield 338, an instance subfield 340 and an attribute subfield 342.

Figure 20:
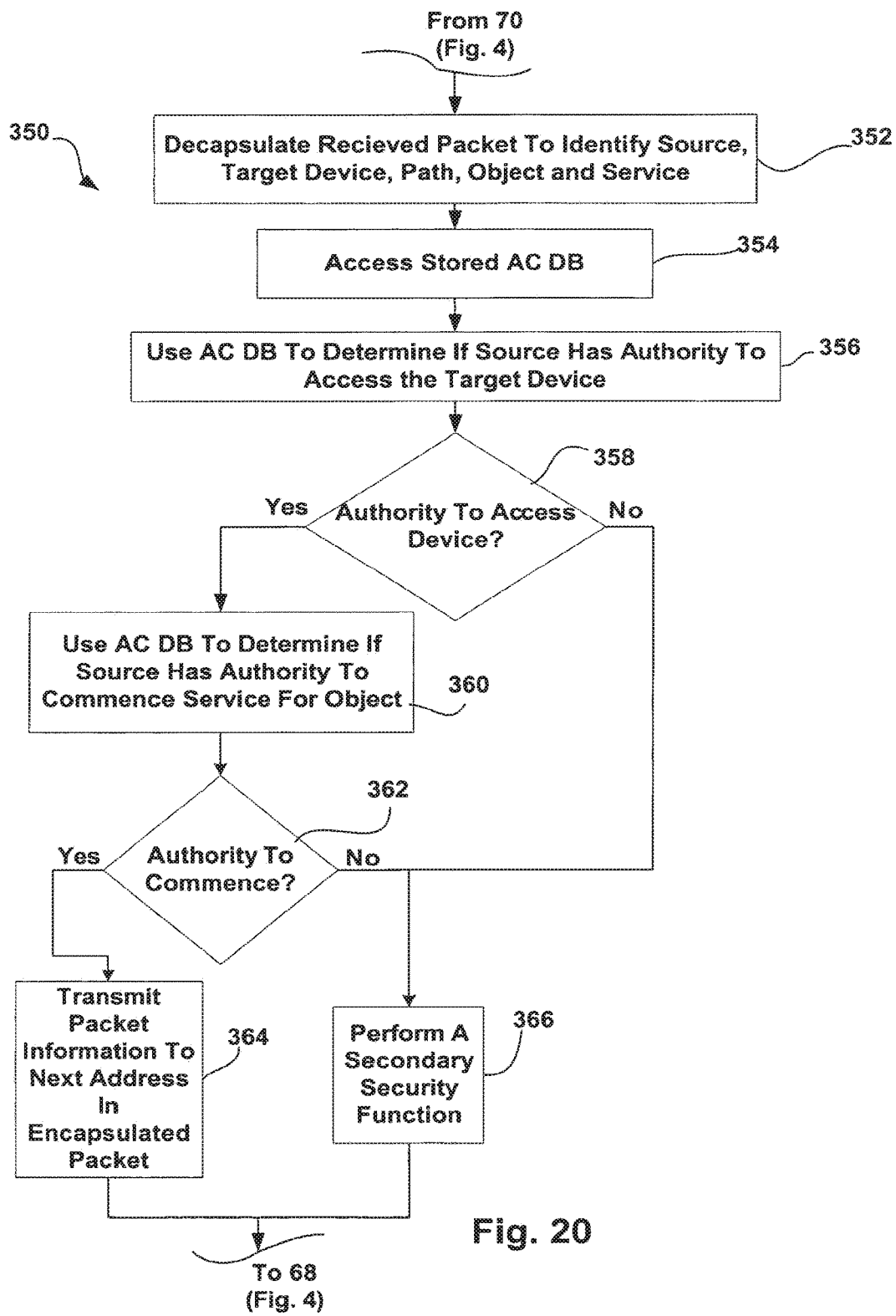
FIG. 20 is a flow chart illustrating a subprocess that may be substituted for a portion of the method of FIG. 4 for processing an unconnected send packet.

Referring now to FIG. 20, an exemplary submethod 350 that may be substituted for a portion of the method 62 illustrated in FIG. 4 is shown where the submethod corresponds to a firewall process that may be performed when an unconnected send data packet is intercepted where the packet includes an embedded CIP subpacket. Referring also to FIGS. 1 and 4, after a firewall (e.g., 30) intercepts a packet at block 70, control passes to block 352. At block 352, firewall 30 decapsulates the received packet and identifies the packet source, the target device, an object specified in object path/service field 308 and the service specified in field 308. At block 354, firewall 30 accesses the stored AC database (see again FIG. 28). At block 356, firewall 30 uses the database to determine if the source has authority to access the target device for any purpose. This step may comprise simply checking the list in column 554 of the database 562 to see if the target device is correlated with the source device in column 552. At decision block 358, where the source does not have authority to access the target device for at least one purpose, control passes down to block 366 where a secondary security function is performed. Here, the secondary security function may take any of several different forms including the forms described above with respect to FIGS. 4 through 7.

Referring still to FIGS. 1, 18 and 20, if the source has authority to access the target device at block 358, control passes to block 360 where firewall 30 uses AC database 562 to determine if the source has authority to commence the identified service for the identified object (i.e., object filtering). At block 362, where the source does not have authority to commence the identified service for the identified object, control passes to block 366. Where the source has authority to commence the service for the object, control passes to block 364 where packet information is transmitted to the first device in the non-IP routing path specified by the unconnected send packet (see address in field 312 in FIG. 18). Transmission continues through the non-IP path until a subset of the data is received by the target device. The target device uses the subset of packet information to perform the service at, on or by the object specified in field 308.

Figure 21:
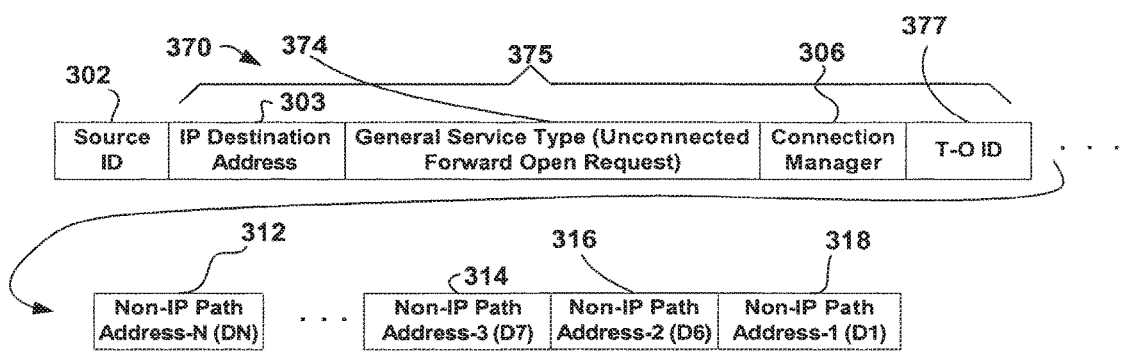
FIG. 21 is similar to FIG. 18, albeit illustrating a packet for initiating an unconnected forward open request service.

Referring now to FIG. 21, another exemplary dual protocol packet 370 including a CIP packet embedded within an IP packet is illustrated. Fields in packet 370 that are similar to fields in packet 300 described above with respect to FIG. 18 are labeled with identical numbers and, in the interest of simplifying this explanation, are not described here in detail. More specifically, fields 302, 303, 306, 312, 314, 316 and 318 are akin to the identically numbered fields in FIG. 18. In FIG. 12, however, the information in fields 302, 303, 312, 314, 316 and 318 is generally the reverse of information in the similarly numbered fields in FIG. 18 (i.e., the source ID in field 302 corresponds to the original target device, the address field 303 corresponds to the original source device and the path specified by fields 312, 314, etc., is the inverse of the path specified by the similarly numbered fields in FIG. 18). In addition to fields 302, 303, 306, 312, 314, 316 and 318, packet 370 includes a general service type field 374 and a T-O ID field 377. Field 374 indicates an unconnected forward open request meaning that a persistent connection should be set up between the source and the target device to facilitate subsequent communications. T-O ID field 377 includes a target-to-originator connection ID that is generated by the source.

Figure 22:
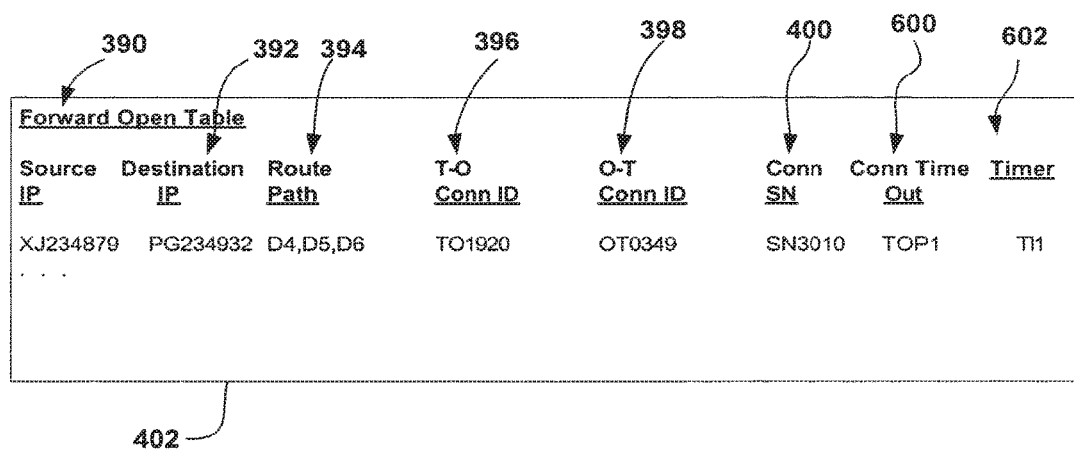
FIG. 22 is a schematic diagram illustrating a forward open table that may be generated and maintained by one of the firewalls in FIG. 1 for keeping track of open connection paths between sources and target network devices.

Referring again to FIG. 1 and also to FIG. 22, in at least some embodiments it is contemplated that firewall 30 may maintain a forward open table 402 for keeping track of open or established connection paths between sources and target network devices. To this end, exemplary table 402 includes a source IP column 390, a destination IP column 392, a route path column 394, a T-O connection ID column 396, an O-T connection ID column 398 and a connection serial number column 400. In FIG. 22, data corresponding to a single open connection path is illustrated and arranged in a single row. Nevertheless, it should be appreciated that many hundreds and even thousands of rows of data may populate table 402 at any given time in a complex system where each row includes information associated with a different currently established path. Source IP column 390 includes a source IP address for each open connection path. Exemplary source IP address in column 390 is XJ234789. Destination IP column 392 includes a destination IP address corresponding an IP destination device within network 21 for each address in column 390. Route path column 394 indicates a route path for each connection path specified in table 402. In the illustrated example, the route path includes devices D4, D5, D6, etc.

Referring still to FIG. 22 column 396 is used to store a T-O connection ID for each of the route paths specified in column 394. In FIG. 22, an exemplary connection ID is T-O 1920. Column 398 is used to store an O-T connection ID corresponding to each of the route paths in column 394. In FIG. 22, exemplary connection ID in column 398 is O-T 0349. In column 400, a separate connection serial number is provided for each of the route paths in column 394.

Referring to FIGS. 1, 21 and 22, when an unconnected forward open packet 370 is intercepted by firewall 30, firewall 30 decapsulates the packet and determines whether or not the source specified by the packet has authority to access the target network device specified by the packet for any reason. Where the source has authority to access the target network device for any reason, firewall 30 populates a new connection path row in table 402 with information directly from the packet 370 including providing information in columns 390, 392, 394 and 396. When firewall 30 populates a new connection path row, firewall 30 also generate a connection serial number and places the serial number is column 400 correlated with the new connection path row. Thus, at this point, all of the new connection path row information in table 402 is specified except for an entry in column 398. When a source does not have authority to access the target network device for at least one reason, the firewall does not create a new connection path row in table 402 and may perform some type of secondary security function.

Continuing, after a new connection path row is partially populated, firewall 30 transmits a packet 370 along with the connection serial number via the designated non-IP route path to the target network device. This subpacket is not illustrated. As a packet is received by each of the non-IP network devices during routing to the target device, each of the route devices decapsulates the received packet, identifies the device from which the packet was received, the next device along the route path to which to transmit a subpacket and the connection serial number, stores identification of the previous device and next device along with the connection serial number in a table akin to forward open table 402 for subsequent routing and then transmits a subpacket to the next device along the prescribed path until the target receives a subpacket.

Figure 23:
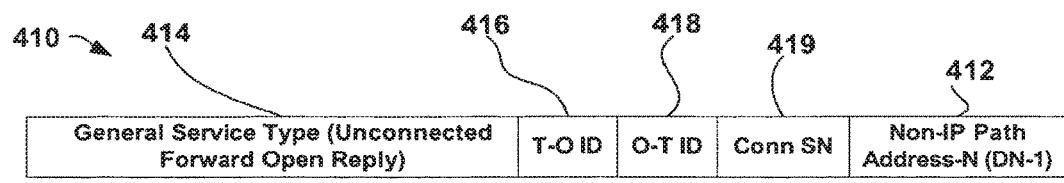
FIG. 23 is similar to FIG. 18, albeit illustrating a packet associated with an unconnected forward open reply service.

When the target network device receives the subpacket including the T-O ID and the connection serial number, the target device recognizes the subpacket as a forward open request and in turn generates an unconnected forward open reply data packet that is transmitted back along the connection path to the firewall 30. In FIG. 23, an exemplary unconnected forward open reply packet 410 is illustrated that includes a general service type field 414, a T-O ID field 416, an O-T ID field 418, a connection serial number field 419 and a non-IP address field 412 (this field 412 may be optional). Field 414 specifies the general service type (i.e., an unconnected forward open reply in the present case). Field 416 includes the T-O ID which is required by the target device to communicate with the source (i.e., the source will not accept communications from the target device without the T-O ID). Field 418 includes an O-T ID which is generated by the target network device and which is required in any communications from the source for the target device to receive the communications. Field 419 includes the connection path serial number associated with the line of communication. Field 412 indicates the non-IP address of the device in the non-IP connection path that precedes the target device.

For instance, referring again to FIG. 1, where a non-IP connection path includes devices D4, D5, D6 . . . DN−1 and DN and device DN is the target device, the address specified in field 412 corresponds to device DN−1. When device DN−1 receives the packet, device DN−1 uses the connection serial number in field 419 to identify the preceding connection path device DN−2 via a lookup table stored by device DN−1 and transmits a packet to that device. This process is repeated until device D4 receives a reply packet and uses information therefrom to generate an IP framed packet to be transmitted to the source. Here, the IP framed packet includes, among other things, the T-O ID, the O-T ID and the connection serial number corresponding to the connection path. When an IP packet is transmitted to the source, firewall 30 intercepts the packet.

Referring still to FIGS. 1, 22 and 23, when firewall 30 intercepts the unconnected forward open reply packet, firewall 30 identifies the O-T ID and the connection serial number and inserts the ID in column 398 in the row associated with the connection serial number.

After the source receives the unconnected forward open reply, the source begins communicating along the established connection path with the target network device without having to completely specify the non-IP routing path and hence communication overhead is reduced appreciably. Instead, the source need only specify the connection serial number which is then used by the non-IP path network devices to route to next devices along the path until a packet is received by the target device.

Figure 24:
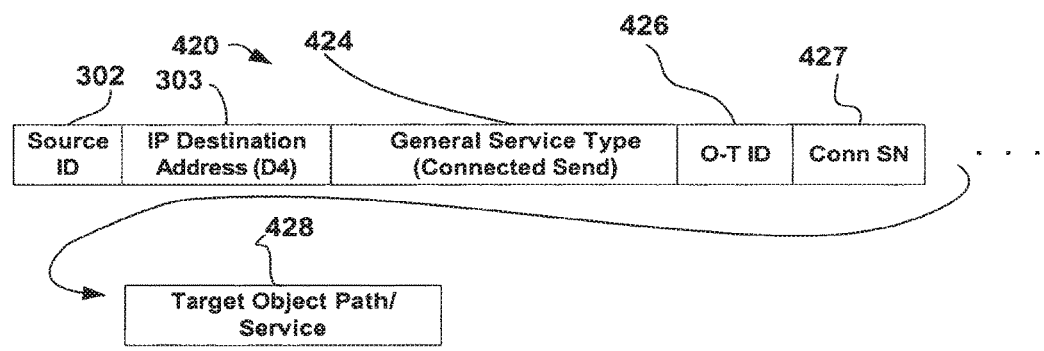
FIG. 24 is similar to FIG. 18, albeit illustrating a packet corresponding to a connected send service.

Referring to FIG. 24, an exemplary connected send packet 420 which may be transmitted by a source to a target network device after a connection path has been established is illustrated. Packet 420 includes source and IP destination address information in fields 302 and 303. A connected send type is indicated in general service type field 424. The O-T ID is specified in field 426 and the connection serial number is specified in field 427. Here, a target object path/service field 428 is populated with an object path and a service to be performed on the object indicated by the object path as described above. When a connected send packet 420 is intercepted by firewall 30, firewall 30 decapsulates the packet, identifies the source, the target network device and the object and service and uses that information to determine whether or not a subpacket should be transmitted on to the target network device.

Figure 25:
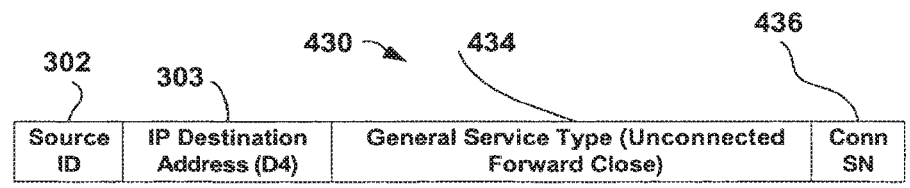
FIG. 25 is similar to FIG. 18, albeit illustrating a packet associated with an unconnected forward close service.

Referring to FIG. 25, to close or eliminate a connection path, a source may be programmed to transmit an unconnected forward close type packet 430. Packet 430 includes source and IP destination information in fields 302 and 303 as well as a general service type field 434 and a connection serial number field 436. When a forward close packet 430 is intercepted by firewall 30, firewall 30 decapsulates the packet, identifies the packet as a forward close type packet by examining the information in field 434, identifies the connection path serial number in field 436 and then discontinues the connection path by deleting the row corresponding thereto in table 402 (see again FIG. 22). In addition, firewall 30 allows disconnect information to be transmitted along the connection path causing devices therealong to delete path related information from their memories.

Figure 26:
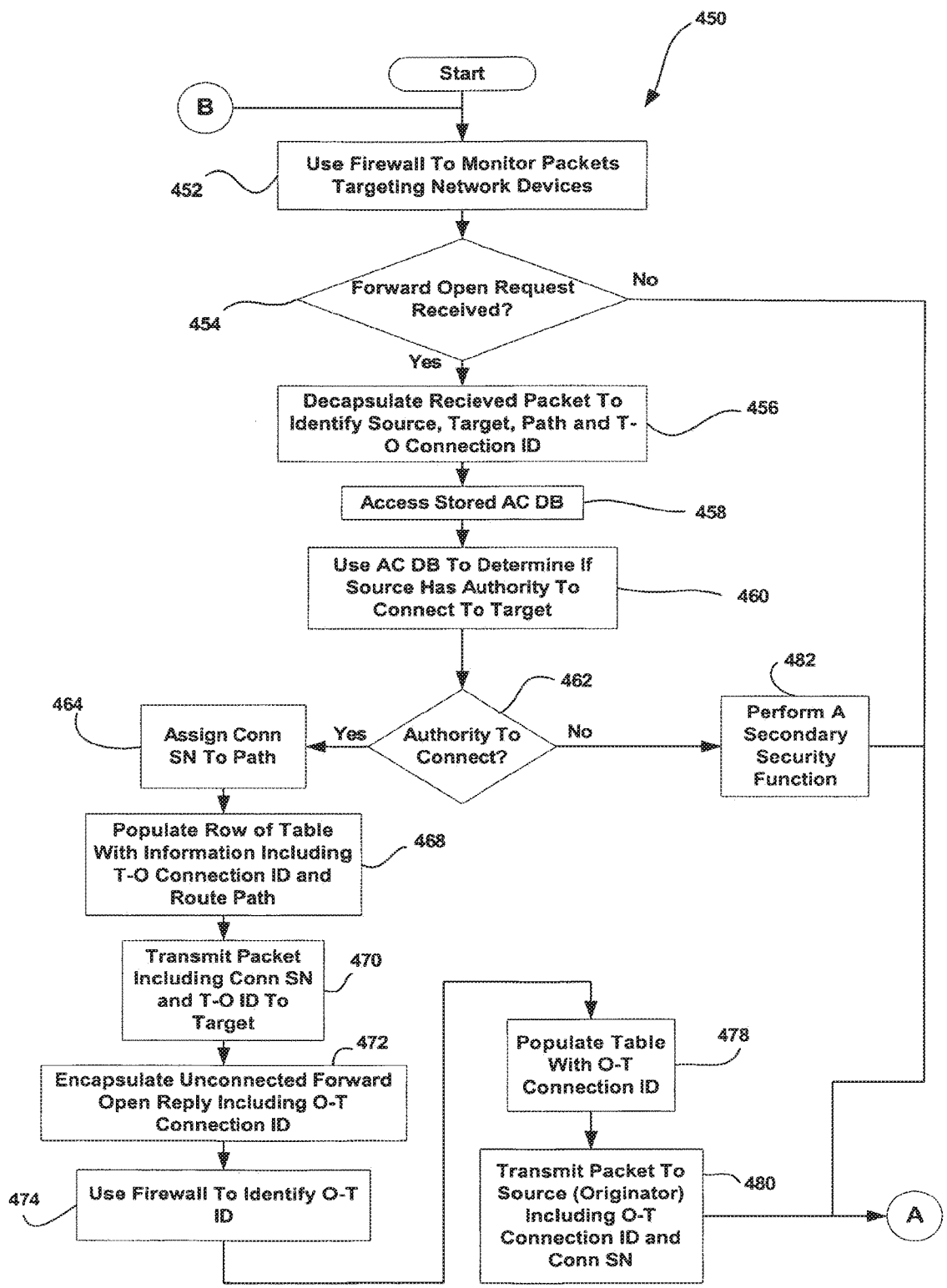
FIG. 26 is a portion of a flow chart illustrating a method that may be performed by one of the firewalls in FIG. 1 to form and eliminate open connection paths.
Figure 27:
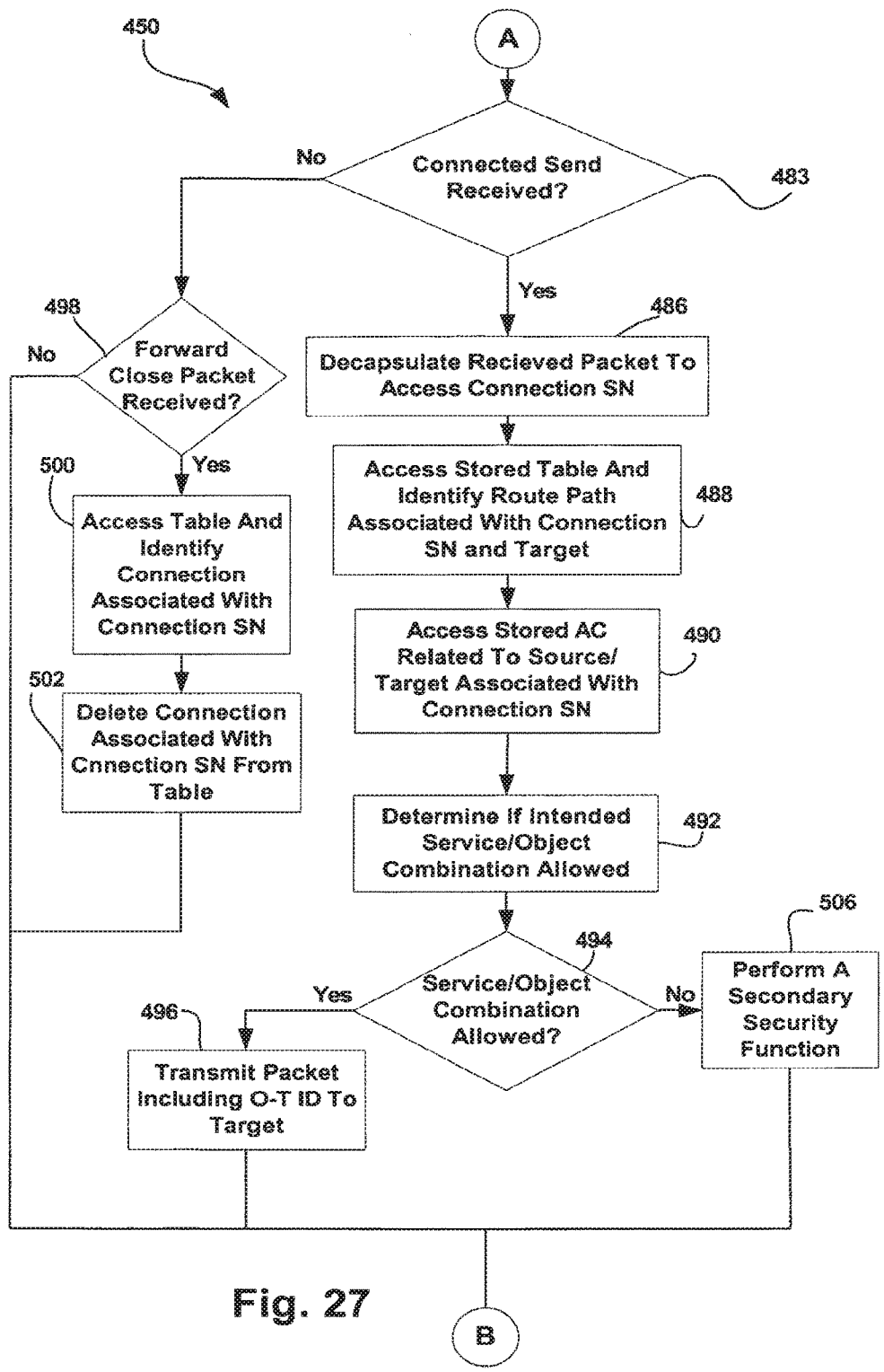
FIG. 27 is another portion of the flow chart illustrated in FIG. 26.

Referring now to FIGS. 26 and 27, an exemplary method 450 for establishing an authorized connection path between a source and a target device for communicating along the path and for eliminating an established connection path is illustrated. Referring also to FIGS. 1 and 22, at block 452, firewall 30 monitors packets that are targeting network 21 devices. Where a forward open request is not received at decision block 454, control passes to block 483 in FIG. 27. Where a connected send packet is not identified at block 483 (here it is assumed that a connection path has previously been specified and instantiated in a firewall forward open table), control passes to block 498. If an unconnected forward close packet is not identified at block 498, control passes back up to block 452 where monitoring of intercepted packets continues.

Referring again to FIGS. 1, 22 and 26, when a forward open request is received at decision block 454, control passes to block 456 where firewall 30 decapsulates the intercepted packet to identify the source of the packet, the target network device, the non-IP path through network 21 and the T-O connection ID. At block 458, firewall 30 accesses the stored AC database 562 (see FIG. 28). At block 460, firewall 30 uses the AC database 562 to determine if the source has authority to connect to the target network device for any purpose. At block 462, where the source does not have authority to connect to the target network device, control passes to block 482 where a secondary security function akin to one of the functions described above is performed. After block 482, control passes to block 483 in FIG. 27.

Referring again to decision block 462, where the source has authority to connect to the target network device for at least one purpose, control passes to block 464 where firewall 30 assigns a connection serial number to the connection path between the source and the target network device. At block 468, firewall 30 populates a portion of a new row of the forward open table 402 with information including the source IP address, the destination IP address, the route path and the T-O connection ID. At block 470, firewall 30 transmits a packet via the non-IP path specified by the unconnected forward open request packet to the target network device that includes the connection serial number and the T-O ID. At block 472, the target network device encapsulates an unconnected forward open reply (see FIG. 23) including an O-T connection ID and transmits that reply to the source. Firewall 30 intercepts the reply packet and, at block 474, the decapsulates the unconnected forward open reply and identifies the O-T connection ID and uses that ID to complete the connection path row in forward open table 402 at block 478. At block 480, the non-IP network device that separates other network 21 devices from the IP network (e.g., device D4 in the present example) generates an IP protocol reply which is transmitted back to the source and that includes the O-T connection ID as well as the connection serial number corresponding to the newly open connection path. After block 480, control passes to block 483 in FIG. 27. At this point, a new connection path has been established and is instantiated in table 402.

Referring to FIG. 27 and also to FIGS. 1 and 22, at block 483, firewall 30 monitors intercepted dual protocol packets targeting network 21 devices for a connected send packet. When a connected send packet is intercepted, control passes to block 486. At block 486 firewall 30 decapsulates a receive packet to access the connection serial number and thereby identify the connection path associated with the connected send packet. At block 488, firewall 30 access the forward open table 402 and identifies the route path associated with the connection serial number as well as the target network device. At block 490, firewall 30 accesses the stored AC database 562 (see FIG. 28) and at block 492 firewall 30 determines if the intended function or service is allowed. At block 494, where the service is not allowed, control passes to block 506 where a secondary security function is performed. After block 506, control passes back up to block 452 in FIG. 26 where the monitoring process continues. At block 494, where the function is allowed, control passes to block 496 where firewall 30 transmits the connected send packet including the T-O connection ID and the connection serial number to the target network device along the path indicated in route path column 394 (see specifically FIG. 22).

Referring again to decision block 483, where a connected send packet has not been intercepted, control passes to block 498 where firewall 30 determines whether or not a forward close packet has been intercepted. When a forward close packet has not been intercepted, control passes back to block 452 in FIG. 26 where monitoring continues. When a forward close packet is intercepted at block 498, control passes to block 500 where firewall 30 accesses forward open table 402 (see again FIG. 22) and identifies the connection path row associated with the connection serial number in the forward close packet. At block 502, firewall 30 deletes the connection path associated with the connection serial number in the forward close packet and control passes back up to block 452 in FIG. 26 where monitoring continues. After a connection path row has been deleted from table 402, if additional communications are attempted using the connection serial number associated with the deleted row, firewall 30 does not allow the communications.

A communication of this type is referred to hereinafter as an "unconnected send" because, as the label implies, a packet is sent in one direction and a connection is not set up between the source and device.

In at least some contemplated embodiments it has been recognized that when a firewall denies a request from a source (e.g., a server, a computer, a network device, etc.), the source can get "hung up" during a timeout period (e.g., 10 seconds) if a properly formatted response to the request is not received. To this end, many sources maintain single string communication stacks for communicating on a network. For instance, referring to FIG. 29, a system 600 is illustrated where a server 590 performs five applications A1-A5 and maintains a CIP stack 592 that lists requests 001, 012, etc. from the applications. A pointer 594 indicates a current request 011 in the stack that has most recently been transmitted 604 to a target device via network 26. Consistent with FIG. 1, firewall 30 intercepts the request 001 and determines if the request is to be halted or continued. In at least some applications, after a request is transmitted 604, server 590 will wait for a response or the end of a timeout period before processing the next request in the stack 592.

In at least some applications timeout periods should be minimized to facilitate fast processing of all requests in the CIP stack 592. According to another aspect of the present invention, when a firewall 30 determines that a request should be denied, the firewall 30 is programmed to generate and transmit 606 a spoofed message back to the requesting server/source where the spoofed message has a format that will be recognized as a response to the request. When the requesting source receives the spoofed message and recognizes the message as a properly formatted response, the source processes the response and releases the CIP stack so that the next stack request (e.g., 012 in the present example) can be processed.

Figure 30:
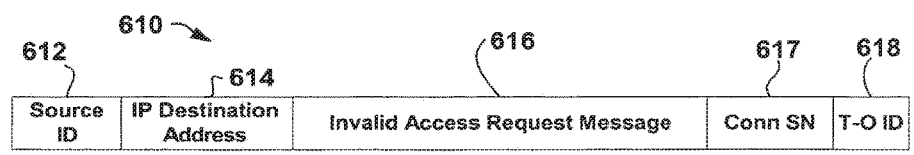
FIG. 30 is similar to FIG. 18, albeit illustrating a spoofed response packet.

Referring now to FIG. 30, an exemplary spoofed response packet 610 is illustrated that includes a source ID field 612, an IP destination address field 614, an "Invalid Access Request" message field 616, a connection SN field 617 and a T-O ID field 618. Source ID field 612 indicates the original target device from the original request packet and field 614 indicates the address of the original source. In the present example the source may be the server 590 or server stack 592. Field 618 includes the target to originator ID (i.e., the T-O ID) from the original request. Here, the information in fields 612, 614, and 618 is all information that is required by the source to accept the packet 610 as a response to the associated request packet.

In at least some cases, some of the information (e.g., source and target identifying information) in the response packet fields will be gleaned or obtained from the original request communication packet. In some cases, other information such as the connection SN in field 617 will be "bogus" information fabricated by firewall 30 to trick the source into recognizing a communication as a response from the target device intended for the source. For instance, where a request corresponds to an unauthorized communication, clearly no connection path is to be formed and therefore no connection SN will be required. However, if a source requires a response packet that includes a serial number, a bogus or fake connection SN has to be generated and used to instantiate an appropriate field in a response packet.

Referring still to FIG. 30, field 616 includes a message or some indication akin thereto that the request was invalid or has been denied. The field 616 indication is used by the receiving source to perform some other function (e.g., indicate an error to a system user, begin a process to generate another request packet, etc.).

Figure 29:
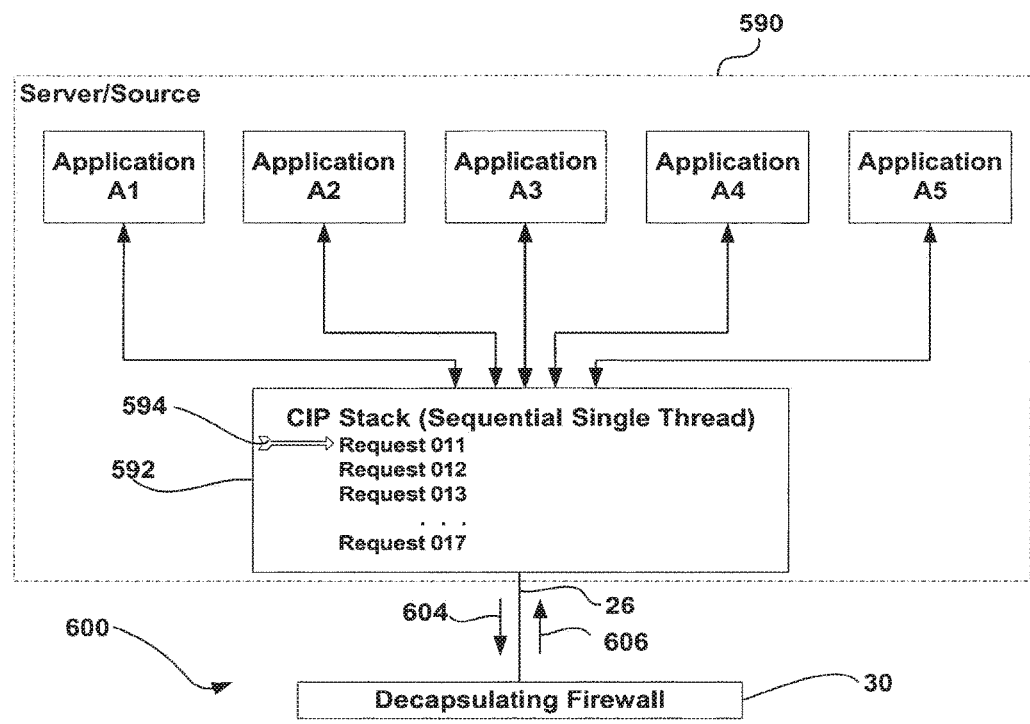
FIG. 29 is a schematic illustrating an exemplary server including a communication stack that is linked to a decapsulating firewall.
Figure 31:
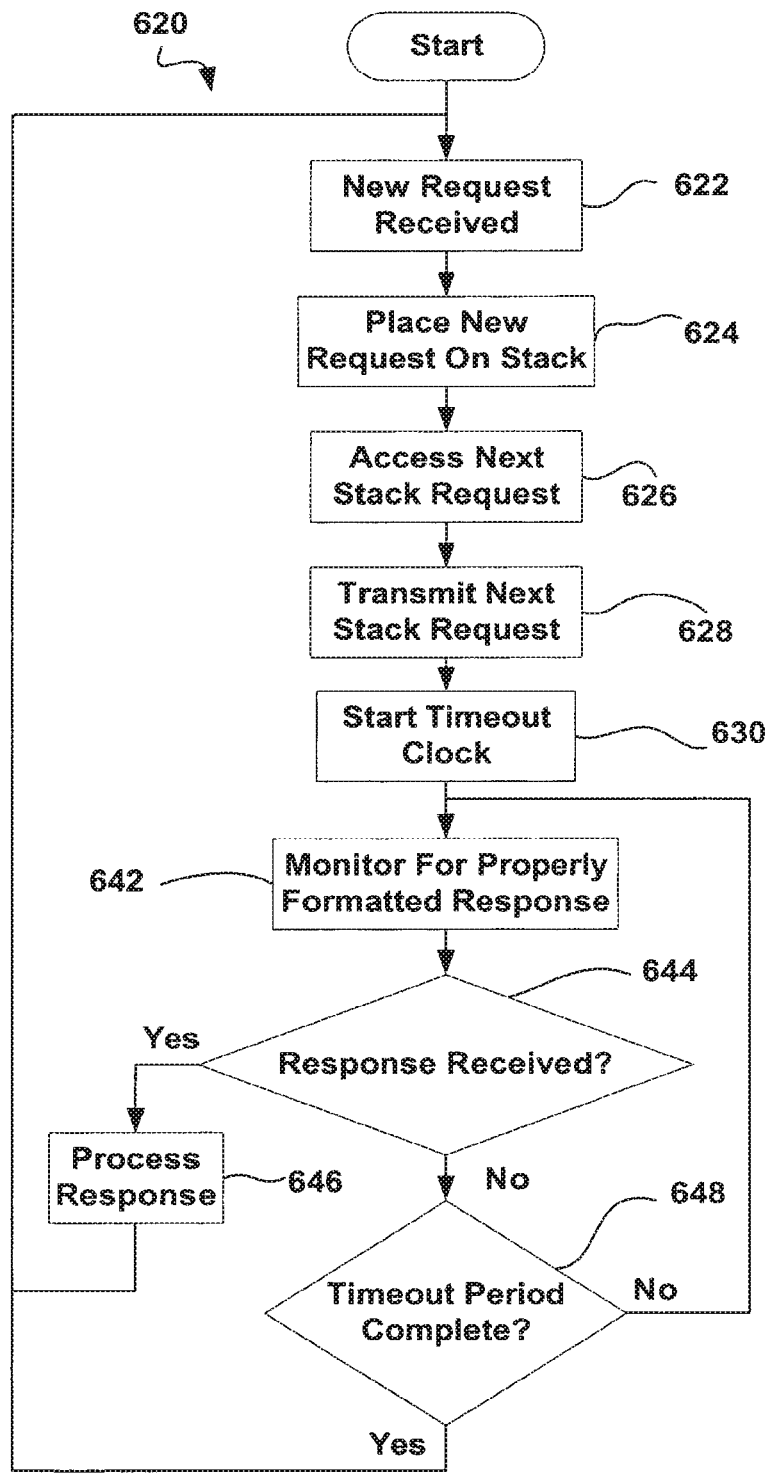
FIG. 31 is a flow chart illustrating a method associated with a communication stack.

Referring now to FIG. 31, a method 620 for maintaining a single string communication stack is illustrated. Referring also to FIG. 29, at block 622, stack 592 receives a new request from one of the applications A1-A5 associated therewith. At block 624, stack 592 adds the request to the stack. At block 626, server 590 accesses the next request in the stack (e.g., in a FIFO manner) and at block 628, server 590 encapsulates and transmits a packet (see 370 in FIG. 21) corresponding to the next stack request to a corresponding target device via network 26. At block 630, stack 592 (or server 590) starts a timeout clock for the specific request.

Referring to FIG. 32, a sub-process 640 that may be substituted for a portion of the process illustrated in FIG. 20 is shown where the sub-process is for generating a spoofed response packet when a request is denied. Referring also to FIG. 29, when firewall 30 receives a request on a network 26, at block 632, firewall 30 determines if the request should be halted or further processed. Where the request should be further processed, control passes back to block 364 in FIG. 20.

At block 632, where the request is to be halted for lack of authority, control passes to block 634. At block 634, firewall 30 generates information required to encapsulate a spoofed response. In the present example, referring again to FIG. 30, the required information to be generated will include, in at least some applications, a connection serial number (SN) as well as a rejection message for instantiating fields 617 and 616, respectively. Here, it should be appreciated that the data generated at block 634 will depend on requirements set by the source (e.g., server 590) and the type of protocol and therefore that other types of spoofed information may be generated. The important point here is that the spoofed data/information and the packet format encapsulated at block 636 should result in a packet that will be received as a properly formatted and legitimate response by the original source. At block 636, a response packet is encapsulated and at block 638 the packet is transmitted to the originating source device.

Referring again to FIGS. 29 and 31, at block 642, server 590/stack 592 monitors network 26 for a response that includes properly formatted and required data (e.g., the correct source and destination, a SN, the appropriate T-O ID, etc.). At block 644, when a response that meets the format and content criteria of a proper response is not received, control passes to block 648 where server 590 monitors the timeout clock. When the timeout period has not expired, control loops back up to block 642. When the time out period expires at block 648, control passes back up to block 622 where the process described above is repeated.

Referring still to FIGS. 29 and 31, when a response that meets the format and content criteria of a proper response is received, control passes to block 646 where the response is processed. Here, in the case of a spoofed response, the receiving server/source may simply indicate to a system operator that an error has occurred. In other cases the error may prompt an associated application to generate a following request.

While the CIP example herein is described in the context of a firewall that is separate from the non-IP network devices, it should be appreciated that, in at least some embodiments, the firewall functionality may be embedded within a non-IP network device (e.g., a PLC) that is dedicated to firewall activities or in a non-IP network device that performs other functions in addition to firewall activities.

Referring again to FIG. 1, in at least some embodiments it is contemplated that when a persistent connection path is created between a source (e.g., S1) and a non-IP network device (e.g., DN), communications/transmissions should generally be regular such that the period between consecutive transmissions. is no longer than a maximum duration. Here, when more than a maximum duration or a maximum timeout period occurs since a most recent packet transmission on a specific connection path, a firewall may be programmed to close the connection path by deleting the path from the forward open table.

To this end, referring also to FIG. 22, forward open table 402 may, in addition to the columns described above, include a connection timeout column 600 and a timer column 602. Timeout column 600 includes a separate timeout period (e.g., TOP1) for each of the connection path serial numbers in column 400. The timeout periods may be specified by source devices that initiate connection paths or may be generated by a firewall in at least some embodiments. The timeout periods may all be the same or may be connection path specific. Timer column 602 includes a timer value (e.g., TI1) for each timeout period in column 600. Each timer starts at a zero value when a forward open request is received and is reset to a zero value when a transmission along a related connection path is received by the firewall. When a timer value exceeds an associated timeout period in column 600, the firewall closes the associated communication path.

In addition, while the spoofed response process is described above in the context of a server as a source, it should be appreciated that many system components and even applications may include a single string stack and may be hung up when a firewall receives an unauthorized request. In at least some cases it is contemplated that a firewall may be programmed to spoof any application or component that generates a request for which a response is required. Here, the formats and required data in the different responses may be different but the spoofing principle is the same. The firewall will simply be programmed to generate several different types of spoofed messages for return to request sources and will generate the appropriate message for each source.

Moreover, while the examples above are described in the context of specific types of first and second protocols, it should be appreciated that at least some inventive embodiments are independent of protocol type (i.e., the first or framing protocol may be other than an Ethernet protocol and the embedded protocol may be any protocol employed in the industrial industries).

Furthermore, to be clear, in at least some applications it is contemplated that the embedded messages could be nested. For instance, an Ethernet message may contain a CIP message with a first embedded destination which in turn may contain a CIP or other protocol message with yet another or second embedded distinction and so on. Here, in at least some application, the firewall concept may cause a processor to evaluate one, or all or a subset of the embedded destinations and intended activities when a n-tier encapsulation occurs.

In addition, while the invention above is described in the context of databases that specify access control information for destination resources, it should be appreciated that the invention also contemplates specifying access controlling information for source resources. For instance, a database may specify that a specific workstation or hand held device associated with a specific user can only be used to access and manipulate specific resources. Here, after decapsulation of a packet, a processor uses the access controlling information to determine if transmission should be restricted. Thus, where access control information is specified, specification should be viewed broadly unless otherwise indicated to include any data form that specifies access rules related to resources regardless of whether the database rules are based on destination or source resources.

To apprise the public of the scope of this invention, the following claims are made:

What is claimed is:

1. A method for selectively enabling communication of dual protocol packets from a source device directed to a service of an object class at target devices, the method comprising:
providing an access control database including at least one entry correlating the source device, an object class and a service of the object class;
receiving a dual protocol packet communicated from the source device, the dual protocol packet including a frame and a field according to a first network communications protocol and an encapsulated packet of a second network communications protocol in the field;
obtaining from the frame of the received dual protocol packet, according to the first network communications protocol, an identification of the source device;
obtaining from the encapsulated packet, according to the second network communications protocol, an identification of the object class and the service of the object class to which the encapsulated packet is directed;
comparing the identification of the source device, the identification of the object class and service of the object class, and the at least one entry of the access control database; and
selectively transmitting the dual protocol packet as a function of the comparison.

2. The method of claim 1, wherein the first network communications protocol is an IP network communications protocol.

3. The method of claim 1, wherein the second network communications protocol is a common industrial protocol (CIP) network communications protocol.

4. The method of claim 1, wherein the comparison includes determining whether an entry of the access control database correlates the source device and the service of the object class obtained from the received dual protocol packet.

5. The method of claim 4, wherein the dual protocol packet is selectively transmitted if the entry of the access control database correlates the source device and the service of the object class obtained from the received dual protocol packet.

6. The method of claim 4, wherein the dual protocol packet is selectively transmitted if no entry of the access control database correlates the source device and the service of the object class obtained from the received dual protocol packet.

7. The method of claim 1, wherein the identification of the source and object class to which the encapsulated packet is directed is obtained by decapsulating the dual protocol packet.

8. The method of claim 1, wherein the identification of the source and object class to which the encapsulated packet is directed is obtained by decapsulating the encapsulated packet.

9. A method for configuring a decapsulating firewall to selectively enable communication of dual protocol packets from a source device directed to a service of an object class at target devices, the method comprising:
providing a graphical user interface to a user which includes at least one control for making an entry in an access control database correlating the source device, an object class and a service of the object class;
making the entry in the access control database correlating the source device, the object class and the service of the object class if the user operates the at least one control of the graphical user interface; and
if at least one entry correlating the source device, object class and service of the object class has been made in the access control database, operating the decapsulated firewall by:
receiving a dual protocol packet communicated from the source device, the dual protocol packet including a frame and a field according to a first network communications protocol and an encapsulated packet of a second network communications protocol in the field;
obtaining from the frame of the received dual protocol packet, according to the first network communications protocol, an identification of the source device;
obtaining from the encapsulated packet, according to the second network communications protocol, an identification of the object class and the service of the object class to which the encapsulated packet is directed;
comparing the identification of the source device, the identification of the service of the object class and the at least one entry of the access control database; and
selectively transmitting the dual protocol packet as a function of the comparison.

10. The method of claim 9, wherein the first network communications protocol is an IP network communications protocol.

11. The method of claim 9, wherein the second network communications protocol is a common industrial protocol (CIP) network communications protocol.

12. The method of claim 9, wherein the comparison includes determining whether an entry of the access control database correlates the source device and the service of the object class obtained from the received dual protocol packet.

13. The method of claim 12, wherein the dual protocol packet is selectively transmitted if the entry of the access control database correlates the source device and the service of the object class obtained from the received dual protocol packet.

14. The method of claim 12, wherein the dual protocol packet is selectively transmitted if no entry of the access control database correlates the source device and the service of the object class obtained from the received dual protocol packet.

15. The method of claim 9, wherein the identification of the source and object class to which the encapsulated packet is directed is obtained by decapsulating the dual protocol packet.

16. The method of claim 9, wherein the identification of the source and object class to which the encapsulated packet is directed is obtained by decapsulating the encapsulated packet.

17. An apparatus for selectively enabling communication of dual protocol packets from a source device directed to a service of an object class at target devices, the apparatus comprising:
a firewall programmable to perform the steps of:
providing an access control database including at least one entry correlating the source device, an object class and a service of the object class;

receiving a dual protocol packet communicated from the source device, the dual protocol packet including a frame and a field according to a first network communications protocol and an encapsulated packet of a second network communications protocol in the field;

obtaining from the frame of the received dual protocol packet, according to the first network communications protocol, an identification of the source device;

obtaining from the encapsulated packet, according to the second network communications protocol, an identification of the object class and the service of the object class to which the encapsulated packet is directed;

comparing the identification of the source device, the identification of the object class and service of the object class, and the at least one entry of the access control database; and selectively transmitting the dual protocol packet as a function of the comparison.

18. The apparatus of claim 17, wherein the first network communications protocol is an IP network communications protocol and the second network communications protocol is a common industrial protocol (CIP) network communications protocol.

19. The apparatus of claim 17, wherein the comparison includes determining whether an entry of the access control database correlates the source device and the service of the object class obtained from the received dual protocol packet.

20. The apparatus of claim 17, wherein the identification of the source and object class to which the encapsulated packet is directed is obtained by decapsulating the encapsulated packet.

* * * * *